US012561302B1

(12) United States Patent
Roy et al.

(10) Patent No.: US 12,561,302 B1
(45) Date of Patent: Feb. 24, 2026

(54) MULTI-VERSION DATABASE WITH TREE STRUCTURED STORAGE AND LOG STRUCTURED STORAGE

(71) Applicant: Amazon Technologies, Inc., Seattle, WA (US)

(72) Inventors: Gourav Roy, Issaquah, WA (US); Falesh Singh, Seattle, WA (US); Marc Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/757,272

(22) Filed: Jun. 27, 2024

(51) Int. Cl.
G06F 16/22 (2019.01)
G06F 16/21 (2019.01)

(52) U.S. Cl.
CPC ........ G06F 16/2246 (2019.01); G06F 16/219 (2019.01)

(58) Field of Classification Search
CPC ........................... G06F 16/2246; G06F 16/219
See application file for complete search history.

(56) References Cited

U.S. PATENT DOCUMENTS

| | | | |
|---|---|---|---|
| 5,644,763 A | 7/1997 | Roy | |
| 6,633,817 B1 | 10/2003 | Walker | |
| 7,331,020 B2 | 2/2008 | Chang | |

| | | | |
|---|---|---|---|
| 8,768,977 B2 * | 7/2014 | Golab | ................... G06F 16/219 |
| | | | 707/806 |
| 2005/0065964 A1 | 3/2005 | Ziemann | |
| 2009/0063548 A1 * | 3/2009 | Rusher | .................. G06F 16/219 |
| | | | 707/999.102 |
| 2014/0297592 A1 * | 10/2014 | Ohtake | ..................... G06F 8/71 |
| | | | 707/638 |
| 2019/0065508 A1 * | 2/2019 | Guturi | ................. G06F 16/9027 |
| 2020/0201828 A1 * | 6/2020 | Ren | .......................... G06F 18/22 |
| 2020/0301882 A1 * | 9/2020 | Pogde | ................. G06F 11/1451 |
| 2021/0097043 A1 * | 4/2021 | Xiao | ........................ G06F 3/064 |
| 2023/0153282 A1 * | 5/2023 | Sun | ..................... G06F 16/2358 |
| | | | 707/695 |
| 2023/0409545 A1 * | 12/2023 | Gupta | ................... G06F 16/211 |
| 2024/0028589 A1 * | 1/2024 | Shatsky | ............... G06F 16/244 |
| 2025/0165454 A1 * | 5/2025 | Dragojevic | ......... G06F 16/2246 |

OTHER PUBLICATIONS

U.S. Appl. No. 18/755,437, filed Jun. 26, 2024, Gourav Roy.
U.S. Appl. No. 18/194,578, filed Mar. 31, 2023, Marc Brooker et al.

* cited by examiner

*Primary Examiner* — Huawen A Peng
(74) *Attorney, Agent, or Firm* — Alexander A. Knapp; Kowert, Hood, Munyon, Rankin & Goetzel, P.C.

(57) ABSTRACT

A storage node may organize a database by storing current data in a balanced tree structure and storing prior data in a log structure. The storage node may update the database by replacing old data in the balanced tree with new data from a write and writing the old data to the log structure. The storage node may be able to locate appropriate date to respond to time-specific queries using the balanced tree structure and the log, and may be able to locate and remove old data with minimal computational resources.

20 Claims, 18 Drawing Sheets

Snapshot 1000

Key: 1
Value: *
LSN: 10

Key: 2
Value: &
LSN: 7

Key: 3
Value: #
LSN: 11

Key: 4
Value: )
LSN: 1

Key: 5
Value: +
LSN: 3

Key: 6
Value: @
LSN: 9

Tree Structured Storage 102

Path Node 700

Path Node 700

Path Node 700

Path Node 700

Leaf Node 702A
Key: 1
Value: *
LSN: 10

Leaf Node 702B
Key: 2
Value: &
LSN: 7

Leaf Node 702C
Key: 3
Value: #
LSN: 11

Leaf Node 702D
Key: 4
Value: )
LSN: 1

Leaf Node 702E
Key: 5
Value: +
LSN: 3

Leaf Node 702F
Key: 6
Value: @
LSN: 9

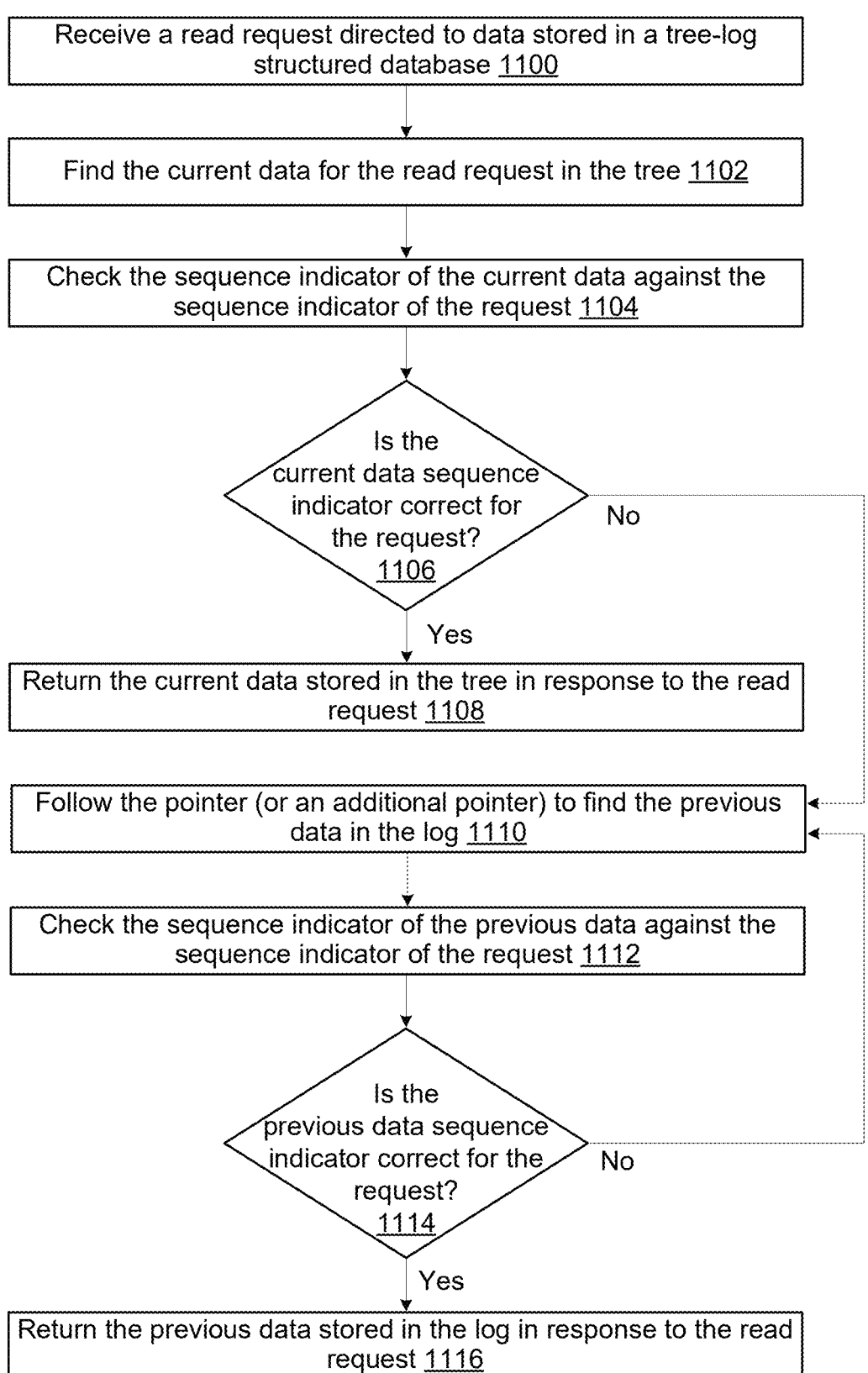

Receive a read request directed to data stored in a tree-log structured database 1100

Find the current data for the read request in the tree 1102

Check the sequence indicator of the current data against the sequence indicator of the request 1104

Is the current data sequence indicator correct for the request? 1106

No

Yes

Return the current data stored in the tree in response to the read request 1108

Follow the pointer (or an additional pointer) to find the previous data in the log 1110

Check the sequence indicator of the previous data against the sequence indicator of the request 1112

Is the previous data sequence indicator correct for the request? 1114

No

Yes

Return the previous data stored in the log in response to the read request 1116

FIG. 11

Receive a write request to write data to a tree-log structured database 1200

Find the current data affected by the write request in the tree 1202

Write the new data to the tree 1204

Write the previously current data to the log 1206

Place a pointer from the new data in the tree to the previously current data in the log 1208

MULTI-VERSION DATABASE WITH TREE STRUCTURED STORAGE AND LOG STRUCTURED STORAGE

BACKGROUND

Commoditization of computer hardware and software components has led to the rise of service providers that provide computational and storage capacity as a service. At least some of these services include database services. Some database services are implemented such that prior versions of data are discarded, or alternatively are stored using the same storage structure as current data. Databases which do not store prior data may be unable to respond to queries specifically seeking a prior version of data at a particular time. Database services that store prior data in the same structure as current data may unnecessarily clutter a data storage unit with less likely to be accessed prior version information.

BRIEF DESCRIPTION OF THE DRAWINGS

FIG. 11 is a flowchart illustrating a method of executing a read request for a multi-version database, according to some embodiments.

Figure 1:
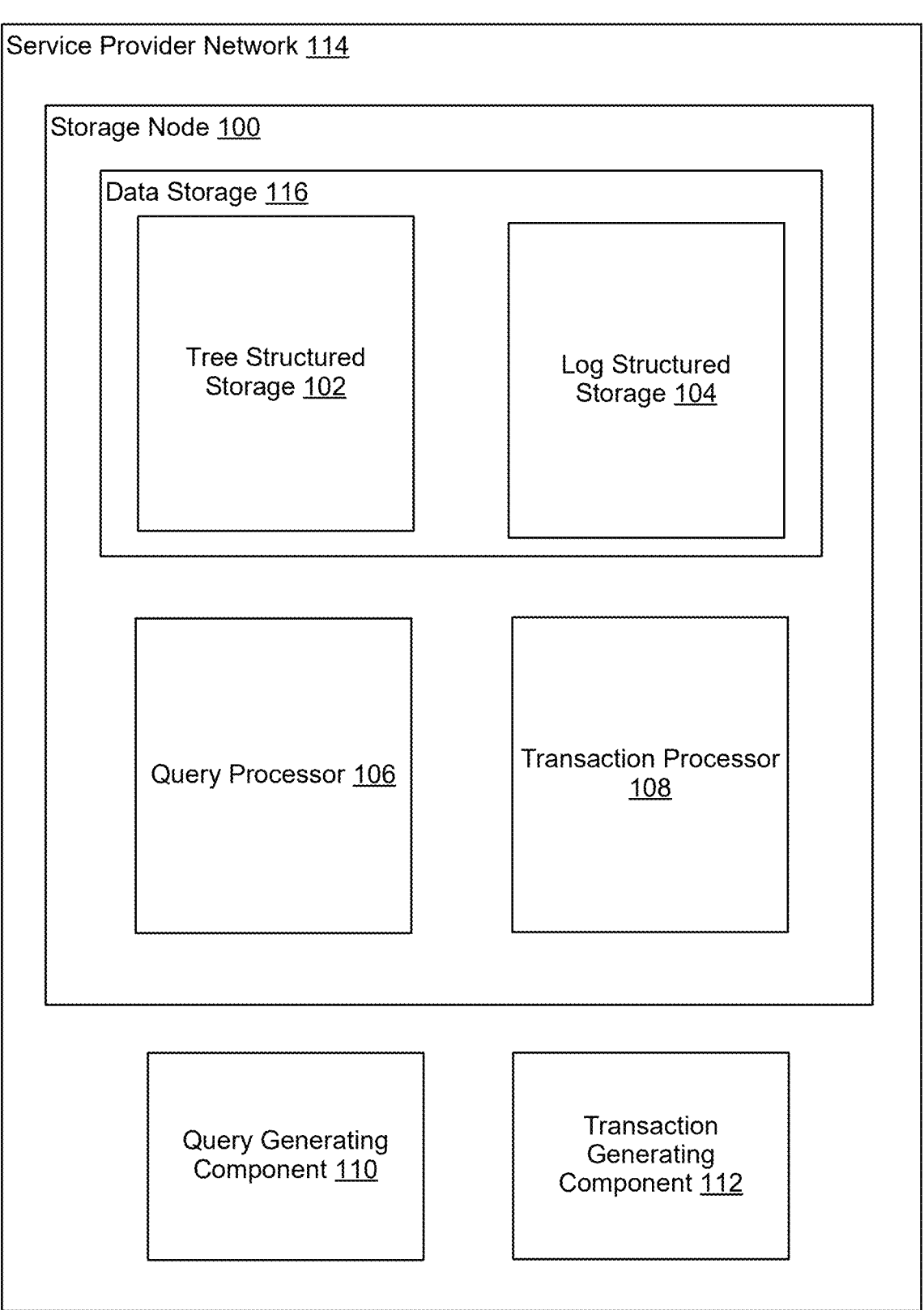
FIG. 1 is a block diagram illustrating a multi-version database with a tree structured storage and a log structured storage, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION

A database storage system may organize a database by storing current data in a tree structure and prior versions of the current data in a log structure. The database storage system may use fewer computational resources to search the tree structure to respond to queries than may be used to search storages using other structure types. The database storage system may also trim the log structure in order to remove unnecessary older data and prevent overuse of data storage space. A more recent version of data associated with a given key may be stored in a tree structure and associated with a pointer to a prior less recent version of the data associated with the key, so that the database storage system may locate prior versions of data, if needed, by first locating the current version of data in the tree structure, and then using the associated pointer stored with the current version of the data in the tree structure to locate a prior version of the data stored in the log structure.

The database storage system may use a storage node or a set of storage nodes to store and manage the database. The tree structured storage may be a balanced tree structured storage which stores current data in leaf nodes and uses parent nodes of the tree to locate leaf nodes, wherein the parent nodes indicate a path to the leaf nodes based on a key being searched for, and the leaf nodes correspond to particular keys. Additionally, prior versions of data may also be associated with the respective keys, such that a key is associated with multiple versions of data for a given key value, wherein the most recent version of the data for a given key is stored in the tree structured storage and prior versions of data for a given key are stored in the log structured storage. In some embodiments, the log structured storage may be an append-only log structured storage, and may additionally store pointers to earlier prior versions of data, for a given key, that are stored in the log. To locate a prior version of data for a given key, the database storage system may follow pointers stored with the current version and other prior (non-current) versions of the day for a given key in order to locate a particular version of data that was the current version of the data for the given key at a time specified in the read request.

The current version of data associated with a given key and the prior version of data associated with the given key may be associated with indications of time. For example, a write may be assigned a transaction sequence number, a logical sequence number, or a timestamp to indicate the sequence of the write relative to other transactions, such as other writes. For clarity, time indications will be generally referred to as logical sequence numbers (LSN). However, other indicators of time may be used in some embodiments. A write with a higher LSN than the LSN of another write can be said to have occurred after the other write. A write with a lower LSN than the LSN of another write can be said to have occurred earlier than the other write. Writes may be executed out of order, so a write may not have a literal time-based relationship to a write at a different key.

A read request may also have an LSN. The LSN of a read request may be based on when the request was made, or the LSN may be specified based on a time the requester of the read is interested in. A read request also may be independent from LSNs and may instead request a version, for example, the current version of data or the most recent prior version of data. In some embodiments, a read may specify a point in time for a version of data to be read for a particular key. In such situations, a query engine of the database may determine an LSN that corresponds to the request time, and may further issue a read request requesting to return a version of the data using the determined LSN.

Writes may be transactions to the database such as inserts, updates, and deletes of data. The database storage system may treat a delete as if the delete were an update by placing a marker indicating the key is not in use in the tree structured storage, and may include a pointer to the prior version of the data associated with that key, for example that has been moved to the log structured storage. The database storage system may write an insert by adding a leaf node for the inserted data to the balanced tree structured storage and assigning a key to the inserted data.

FIG. 1 is a block diagram illustrating a multi-version database with a tree structured storage and a log structured storage, according to some embodiments.

The database storage system may be hosted by computing resources of a service provider network 114. The computing resources may include devices such as computer system 1000 shown in FIG. 10. The database storage system may be implemented on a storage node 100 or set of storage nodes 100. Storage node 100 may store and manage data storage 116 which includes tree structured storage 102 and log structured storage 104. Storage node 100 may also include query processor 106 and transaction processor 108. The query processor 106 may execute read requests that the storage node 100 receives. The transaction processor 108 may execute write requests that the storage node 100 receives.

In some embodiments, the query processor 106 and transaction processor 106 may be components of a database management system of a storage node which a storage service uses to store data. In some embodiments, the query processor 106 and transaction processor 106 may be external to storage node 100. In some embodiments, the query processor 106 may be a component of a database service that uses the storage service to host databases. A transaction processor 108, which may be called an applier, may be a component of a storage service.

Tree structured storage 102 and log structured storage 104 may be logical storage structures. Data in tree structured storage 102 and log structured storage 104 may be stored in data storage units, such as memory or disk storage. Nodes of tree structured storage 102 may include relational pointers, for example pointers from a parent node to child nodes, and between sibling nodes. The query processor 106 may scan data associated with a range of keys using pointers between sibling nodes, for example to generate a snapshot.

The query generating component 110 may generate read requests to be processed by the query processor 106. The query generating component 110 may be part of a system that uses the information stored in the database to form queries to answer requests received by a database. The transaction generating component 112 may generate write requests to be executed by the transaction processor 108. The transaction generating component 112 may be part of a system that is responsible for keeping the database in a current state so that the database remains useful to systems that use the information in the database.

The specification continues with an example network-based database service implemented as part of a service provider network that performs storage using tree structured storage and log structured storage in a given storage node used to implement the database service. Included in the description of the example database service are various aspects of the example database service, such as a hosts for query processors, and a separate storage service. The specification then describes flowcharts of various embodiments of methods for storage using a tree structured storage and a log structured storage. Next, the specification describes an example system that may implement the disclosed techniques. Various examples are provided throughout the specification.

Figure 2:
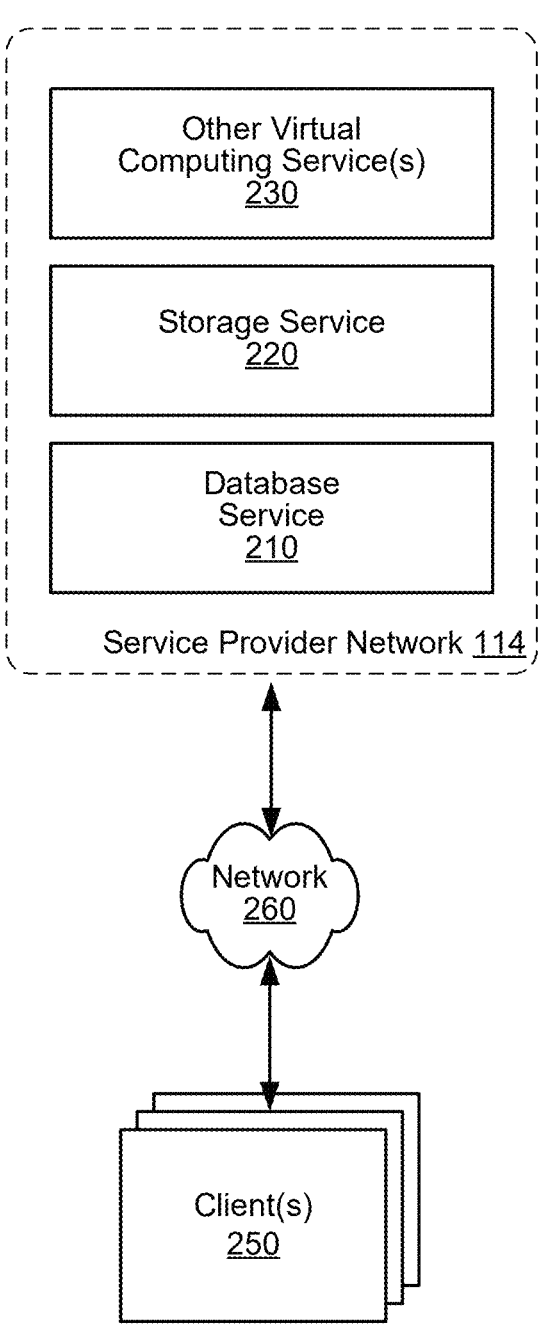
FIG. 2 is a block diagram illustrating a provider network that may implement database services that implement techniques for hosting a multi-version database, according to some embodiments.

FIG. 2 is a block diagram illustrating a provider network that may implement database services that implement techniques for hosting database storage using a tree structured storage and a log structured storage, according to some embodiments.

A service provider network 114 (sometimes referred to as a "cloud provider network" or "cloud") refers to a pool of network-accessible computing resources (such as compute, storage, and networking resources, applications, and services), which may be virtualized or bare-metal. The service provider network 114 can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network 260 (e.g., the Internet, a cellular communication network) and the hardware and software in cloud provider data centers that provide those services.

A service provider network 114 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the provider network via a publicly accessible network (e.g., the Internet, a cellular communication network) by way of a transit center (TC). TCs can be considered as the primary backbone locations linking users to the provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The provider network may deliver content from points of presence outside of, but networked with, these regions by way of edge locations and regional edge cache servers (points of presence, or PoPs). This compartmentalization and geographic distribution of computing hardware enables the provider network to provide low-latency resource access to users on a global scale with a high degree of fault tolerance and stability.

The provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the provider network, which may be provisioned in user accounts.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

An exemplary provider network may include numerous provider network regions and so on that may include one or more data centers hosting various resource pools, such as collections of physical and/or virtualized computer servers, storage devices, networking equipment and the like (e.g., computing system 1300 described below with regard to FIG. 13), needed to implement and distribute the infrastructure and storage services offered by the provider network within the provider network regions.

As illustrated in FIG. 2, a number of clients (shown as clients 250) may interact with a service provider network 114 via a network 260. Service provider network 114 may implement respective instantiations of the same (or different) services, such as a database service 210 for a first region and a second instantiation of database service 210 for a second region, and so on. Similar arrangements may be implemented for storage service 220, as well as various other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 13 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to service provider network 114 via network 260, including requests for database services. For example, a given client 250 may include a suitable version of a web browser, or may include a plug-in module or other type of code module that may execute as an extension to or within an execution environment provided by a web browser. Alternatively, a client 250 (e.g., a database service client)

may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with service of a region of a provider network. In some embodiments, client 250 may generate network-based services requests according to a Representational State Transfer (REST)-style web services architecture, a document-based or message-based network-based services architecture, or another suitable network-based services architecture. Although not illustrated, some clients of service provider network 114 services may be implemented within a service of the provider network (e.g., a client application of database service 210 may be implemented on one of other virtual computing service(s) 230), in some embodiments. Therefore, various examples of the interactions discussed with regard to clients 250 may be implemented for internal clients as well, in some embodiments.

In some embodiments, a client 250 (e.g., a database service client) may be provided access to network-based storage of database data to other applications in a manner that is transparent to those applications. For example, client 250 may be integrated with an operating system or file system to provide storage in accordance with a suitable variant of the storage models described herein. However, the operating system or file system may present a different storage interface to applications, such as a conventional file system hierarchy of files, directories, and/or folders. In such an embodiment, applications may not need to be modified to make use of the storage system service model, as described above. Instead, the details of interfacing to the provider network may be coordinated by client 250 and the operating system or file system on behalf of applications executing within the operating system environment.

Clients 250 may convey network-based services requests to and receive responses from a region of the provider network via network 260. In various embodiments, network 260 may encompass any suitable combination of networking hardware and protocols necessary to establish network-based communications between clients 250 and a service provider network 114. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and the provider network region may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and a provider network. It is noted that in some embodiments, clients 250 may communicate with regions of a provider network using a private network rather than the public Internet. For example, clients 250 may be provisioned within the same enterprise as a database service. In such a case, clients 250 may communicate with a provider network region entirely through a private network 260 (e.g., a LAN or WAN that may use Internet-based communication protocols but which is not publicly accessible).

Generally speaking, service provider network 114 may implement one or more service endpoints may receive and process network-based services requests, such as requests to access a database (e.g., queries, inserts, updates, etc.) and/or manage a database (e.g., create a database, configure a database, etc.). For example, a provider network region may include hardware and/or software may implement a particular endpoint, such that an HTTP-based network-based services request directed to that endpoint is properly received and processed. In one embodiment, a provider network region may be implemented as a server system may receive network-based services requests from clients 250 and to forward them to components of a system that implements database service 210, storage service 220, and/or another virtual computing service 230 for processing. In other embodiments, provider network region may be configured as a number of distinct systems (e.g., in a cluster topology) implementing load balancing and other request management features may dynamically manage large-scale network-based services request processing loads. In various embodiments, a provider network region may support REST-style or document-based (e.g., SOAP-based) types of network-based services requests.

In addition to functioning as an addressable endpoint for clients' network-based services requests, in some embodiments, a service provider network 114 may implement various client management features. For example, service provider network 114 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network regions may also implement financial accounting and billing systems, or may maintain a database of usage data that may be queried and processed by external systems for reporting and billing of client usage activity. In certain embodiments, provider network regions may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments, such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network regions may also implement user authentication and access control procedures. For example, for a given network-based services request to access a particular database table, a provider network region may ascertain whether the client 250 associated with the request is authorized to access the particular database table. Provider network regions may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, the provider network region may reject the corresponding network-based services request, for example by returning a response to the requesting client 250 indicating an error condition. Various access control policies may be stored as records or lists of access control information by database services 210, storage services 220, and/or other virtual computing services 230.

Note that in many of the examples described herein, services, like database service or storage service may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database storage structures on behalf of clients 250 may be transparent to those clients. In other embodiments, storage service 220 may be exposed to clients 250 through service provider network 114 to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region may be unnecessary for internal clients such as administrative clients or between service components within the same enterprise.

Figure 3:
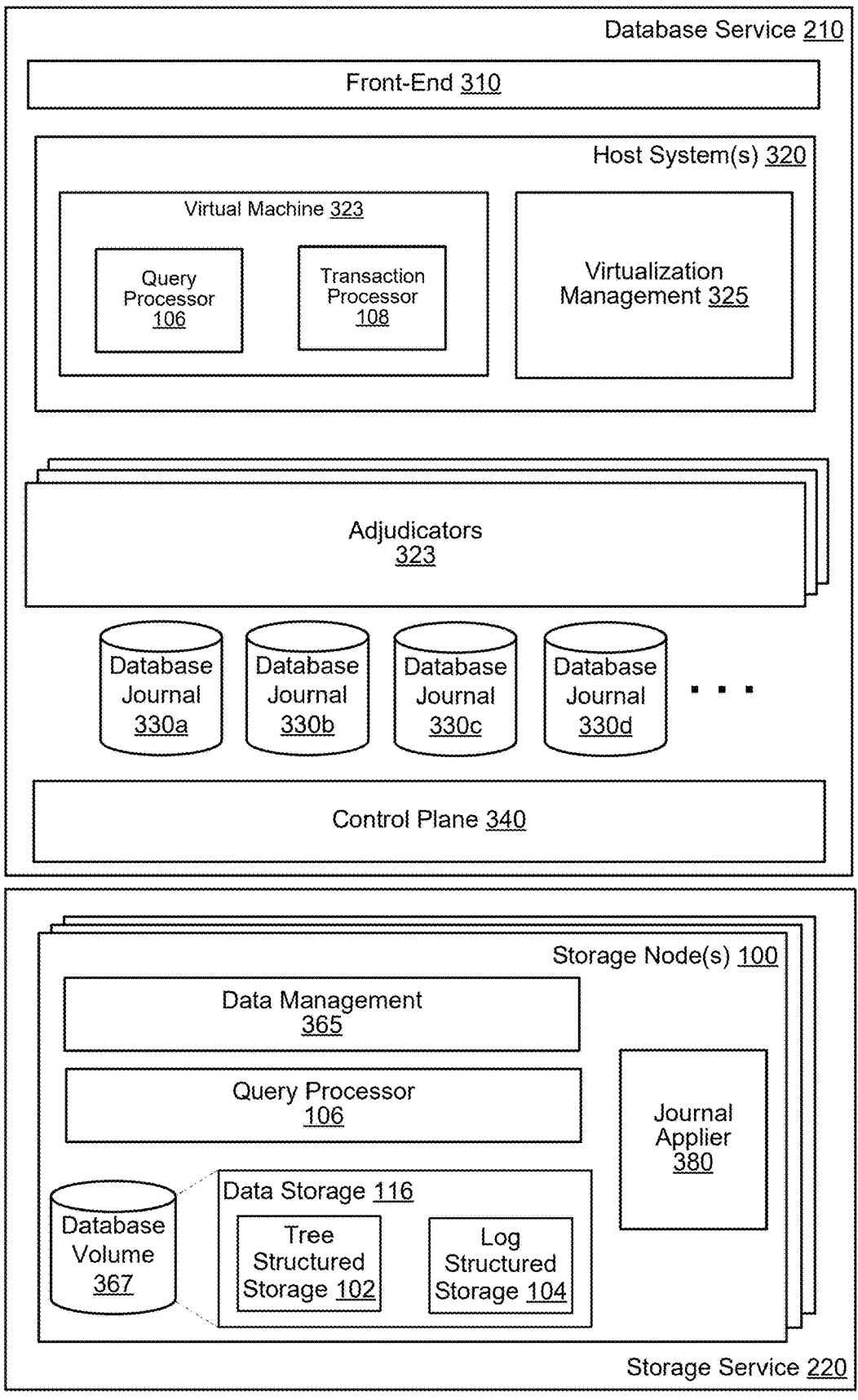
FIG. 3 is a block diagram illustrating various components of a database service and storage service that host a multi-version database, according to some embodiments.

FIG. 3 is a block diagram illustrating various components of a database service and storage service that host a multi-version database, according to some embodiments.

Database service 210 may implement control plane 340 which may manage the creation, provisioning, deletion, or other features of managing a database hosted in database service 210. For example, control plane 340 may monitor the performance of host(s) (e.g., a computing system or device like computing system 1300 discussed below with regard to FIG. 13) for high workloads (e.g., heat) and move or redirect placement of database engine head node instances away from some hosts to avoid overburdening host(s). Control plane 340 may handle various management requests, such as requests to create databases or manage databases (e.g., by configuring or modifying performance), such as by enabling a "serverless" or other automated management feature in response to a request which may cause in-place resource scaling to be enabled for that database. Control plane 340 may direct placement of database engine head node instances on host(s) so as to distribute workload across host(s) to avoid failure scenarios, like out-of-memory.

Database service 210 may implement one or more different types of database systems with respective types of query processors 106 for accessing database data as part of the database. For example, database service 210 may implement various types of connection-based (e.g., having established a network connection between a database client and query processor 106 on a database host system 320) database systems which may, for instance, facilitate the performance of various operations that continue over multiple communications between the database client and the connected query processor 106. In at least some embodiments, database service 210 may be a relational database service that hosts relational databases on behalf of clients.

Database service 210 may implement a fleet of host system(s) 320 which may provide, in various embodiments, a multi-tenant configuration so that different query processors, such as query processor 106 and other query processors, can be hosted on the same virtual machine 323, but provide access to different databases on behalf of different clients over different connections. In some embodiment hosts systems(s) 320 may not be multi-tenant.

In various embodiments, host system(s) 320 may implement a virtualization technology that provides virtualized execution of a query processor 106 and transaction processor 108 in a virtualization unit, such as virtual machine based virtualization or container-based virtualization, wherein various query processors 106 and transaction processors 108 may be executed in different respective virtual machines 323. Host system(s) 320 may implement virtualization management 325, which may support hosting one or multiple separate query processors 106 and transaction processor 108 as different respective virtualization units, such as virtual machines 323, microVMs, or containers. Virtualization management 325 may support increasing or decreasing resources made available to host(s) to use for other tasks.

In some embodiments, database data for a database of database service 210 may be stored in a separate storage service 220. In some embodiments, storage service 220 may be implemented to store database data as virtual disk or other persistent storage drives. In other embodiments, embodiments, storage service 220 may store data for databases using tree structured storage and log structured storage.

For example, data may be organized in various logical volumes, segments, and pages for storage on one or more storage nodes 100 of storage service 220. For example, in some embodiments, each database may be represented by a logical volume, and each logical volume may be segmented over a collection of storage nodes 100. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 100 may receive redo log records and coalesce them to create new versions of the corresponding data and/or additional or replacement log records (e.g., lazily and/or in response to a request for data or a database crash). In some embodiments, data and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, storage nodes 100 of storage service 220 may perform some database system responsibilities, such as the updating the tree or log structured storage for a database, and in some instances perform some query processing on data. As illustrated in FIG. 3, storage node(s) 100 may implement query processor 106, and data management 365 to implement various ones of these features with regard to the data storage 116 in a database volume 367 storing tree structured storage 102 and log structured storage 104 service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Query processor 106 may handle requests to return data from a database volume 367, and may perform operations to coalesce redo log records or otherwise generate data to be returned responsive to a request.

In at least some embodiments, storage nodes 100 may provide multi-tenant storage so that data stored in part or all of one storage device may be stored for a different database, database user, account, or entity than data stored on the same storage device (or other storage devices) attached to the same storage node 100. Various access controls and security mechanisms may be implemented, in some embodiments, to ensure that data is not accessed at a storage node 100 except for authorized requests (e.g., for users authorized to access the database, owners of the database, etc.).

In some embodiments, respective database journals, such as database journals 330a through 330d, may be hosted in database service 210 that stores ordered updates to the database (e.g., to a database volume). Adjudicators 323 may be responsible for deciding whether transactions or writes can be committed (while following isolation rules), for working with database journal(s) 330a through 330d to order transactions, and for ensuring that committed data is strongly consistent. Journal applier 380, which may be transaction processor 108, may apply updates to the database from the database journals 330 as directed by the adjudicators 323.

Front-end 310 may implement a proxy, request router, or other load balancing feature that routes database requests to one or more query processors 106. For example, front-end 310 may be responsible for authenticating requests to connect to a database at a particular network endpoint and allocating a query processor 106 to the connection (or to a particular request such as a query or transaction). The front-end 310 may maintain the connection (e.g., as a proxy) so that if different query processors 106 are used for different requests to the database, separate connections do not have to be established.

Figure 4:
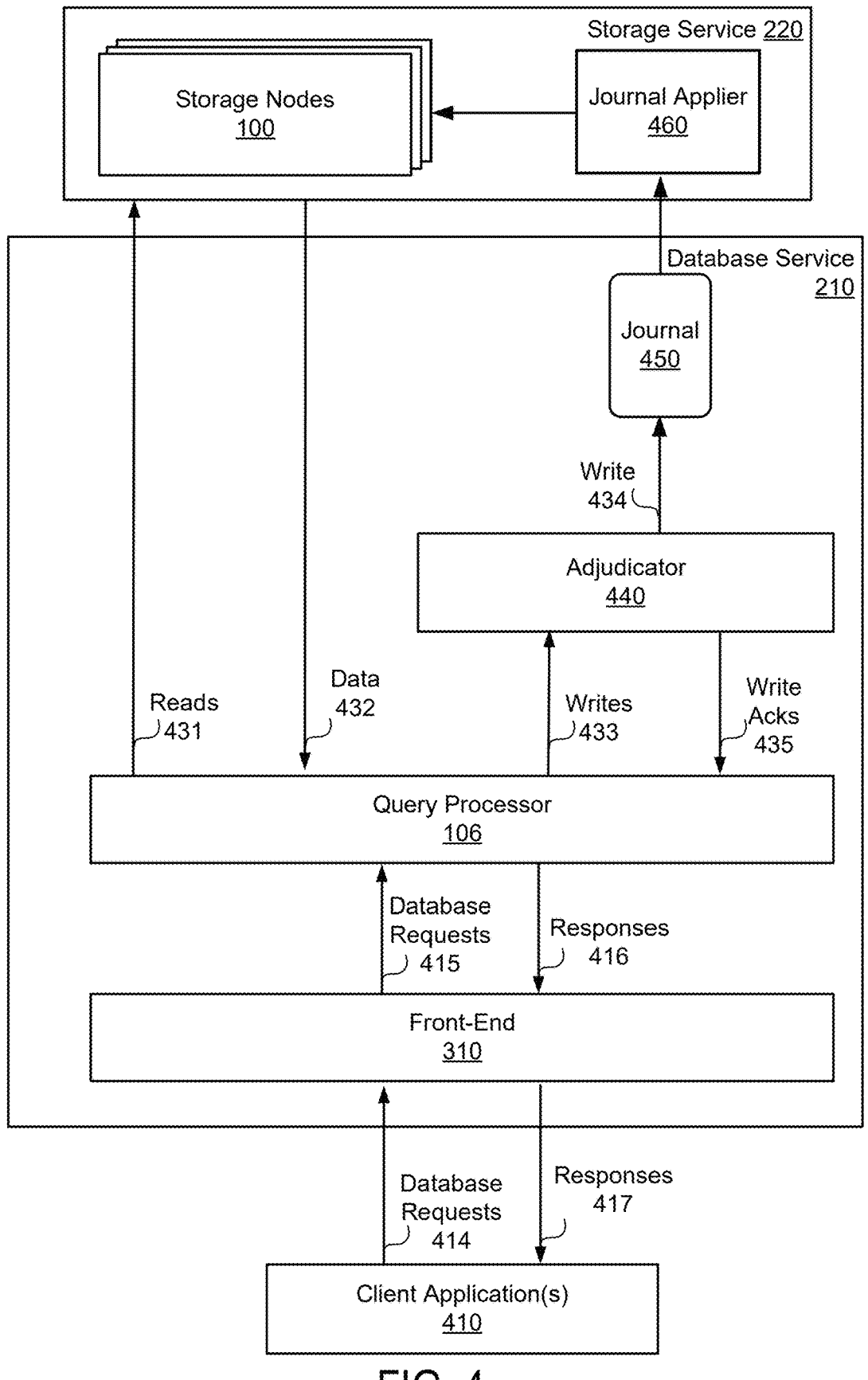
FIG. 4 is a block diagram illustrating the interactions between a database service and separate storage service, according to some embodiments.

FIG. 4 is a block diagram illustrating the interactions between a database service and separate storage service, according to some embodiments.

In this example, one or more client application(s) 410 may store data to one or more databases maintained by a database service 210. Client application(s) 410 may submit database requests 414 (e.g., requests that cause reads, such as queries or read-only transactions, or requests that cause writes, such as updates, inserts, deletions, or transactions that include write statements) and receive responses 417 from front-end 310.

Front-end 310 may dispatch database requests 415 to a query processor 106, which may parse the request and interact with different components according to the type of request. For read request, query processor 106 may rely upon a local cache and/or access storage nodes 100 by submitting read requests 431 for data, which are returned 432 and used to perform the read. For writes, write requests 433 may be sent to an adjudicator 440, which determine whether a conflict exists and if not, writes 434 to journal 450 and acknowledges the write 435 to query processor 106. Responses 416 may then be sent to front-end 310 for response 417 to client application(s) 410. Transactions may be applied to the database by journal applier 460, which may be transaction processor 108, at a time independent of the write acknowledgement 435, responses 416, and responses 417.

Figure 5:
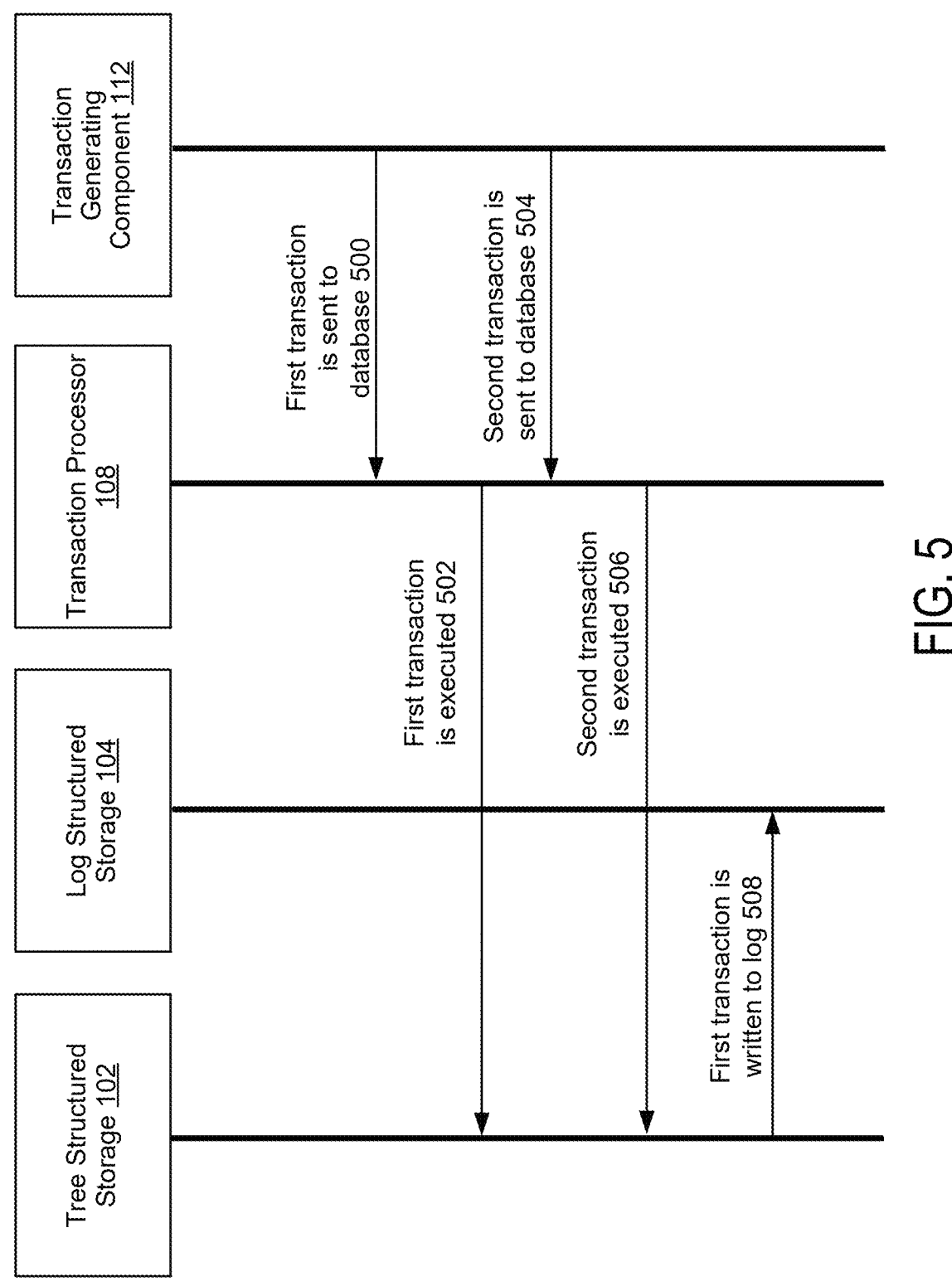
FIG. 5 illustrates actions of components of a multi-version database system during operation, for example during an insert write and an update write, according to some embodiments.

FIG. 5 illustrates actions of components of a multi-version database system during operation, for example during an insert write and an update write, according to some embodiments.

The database storage system may receive a write request at 500, when the transaction generating component 112 sends the first transaction to the transaction processor 108. The first transaction in the example illustrated in FIG. 5 may be an insert write.

At 502, the transaction processor 108 executes the first transaction at the tree structured storage 102. The transaction processor 108 may assign the first transaction an LSN, which may be based on the order the transaction processor 108 received the first transaction. Because the first transaction in this example is an insert, the transaction processor 108 may assign a key to the first transaction. Also, the transaction processor 108 may cause the tree structured storage 102 to designate a new leaf node associated with the new key. The transaction processor 108 may write the data of the insert to the new leaf node. The transaction processor 108 may report the first transaction as executed to the transaction generating component 112.

At 504, the transaction generating component 112 sends the second transaction to the database. In the example illustrated in FIG. 5, the second transaction may be an update write that is associated with the same key as the first transaction. The transaction processor 108 may assign the second transaction an LSN based on the time the transaction processor 108 received the second transaction. The LSN of the second transaction may be higher than the LSN of the first transaction, and the second transaction may be said to have occurred later than the first transaction.

At 506, the transaction processor 108 may execute the second transaction at the tree structured storage 102. The transaction processor 108 may execute the second transaction by updating the leaf node associated with the key to the data of the second transaction. The data of the first transaction may not be in the tree structured storage 102 once the second transaction is executed. The transaction processor 108 may write the data of the first transaction to the log structured storage prior to executing the second transaction or store the first transaction in temporary data storage. The second transaction may be stored in the leaf node associated with the key with a pointer pointing to the first transaction. The first transaction may now be a prior version of data associated with the key, and may be stored in the log.

At 508, the first transaction is written from the tree structured storage 102 to the log structured storage 104. The transaction processor 108 may perform this step by retrieving the data of the first transaction from the tree structured storage 102 when the second transaction is executed and writing the data of the first transaction to the log structured storage 104. The transaction processor 108 may report the second transaction as executed to the transaction generating component 112.

Figure 6:
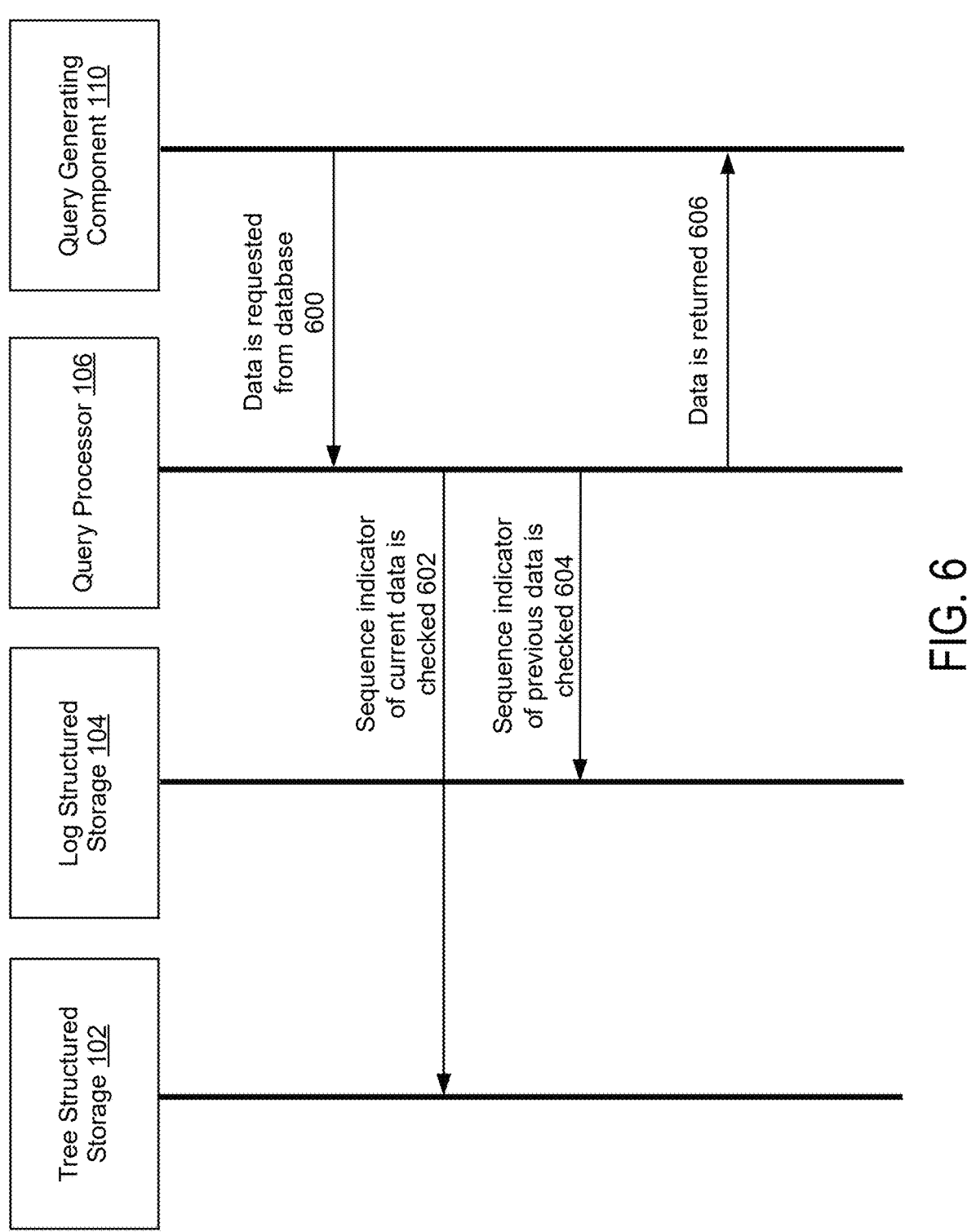
FIG. 6 illustrates actions of components of a multi-version database system during operation, for example during a read, according to some embodiments.

FIG. 6 illustrates actions of components of a multi-version database system during operation, for example during a read, according to some embodiments.

The database storage system may receive a read request at 600, when the query generating component 110 requests data from the database. In the example illustrated in FIG. 6, the read request may include an LSN which is lower than the LSN of the current version of data for the key of the read request. The read request may have a lower LSN than the current version of data for the key because the query processor 106 received the read request before the transaction processor 108 received the write request for the current version of data for the key. The read request may have a lower LSN than the current version of data for the key because the query generating component 110 specified a time corresponding to the read request LSN that is an earlier time than the time corresponding to the LSN for the current version of data for the key.

The query processor 106 uses the tree structured storage 102 to locate the current version of data for the key and checks the sequence indicator, which may be an LSN, of the current version of data for the key. The query processor 106 may determine the LSN of the current version of data for the key is a higher LSN than the read request LSN, and accordingly that the current version of data for the key is later than the data that was requested.

At 604 the query processor follows a pointer stored in the tree structured storage 102 with the current version of data for the key to the prior version of data for the key in the log structured storage 104 and checks the LSN associated with the prior version of data for the key. In the example illustrated in FIG. 6, the LSN of the previous version of data for the key, which corresponds to the version of the data for the key that was the current version of data for the before the present current version of the data for the key, is lower than the LSN of the read request. The lower LSN of the prior version of data for the key indicates that the prior version of data for the key was the current version of data for the key during the LSN of the read request.

At 606, the query processor 106 returns the prior version of data for the key that was the current version of data for the key during the LSN of the read request to the query generating component 110.

Figure 7A:
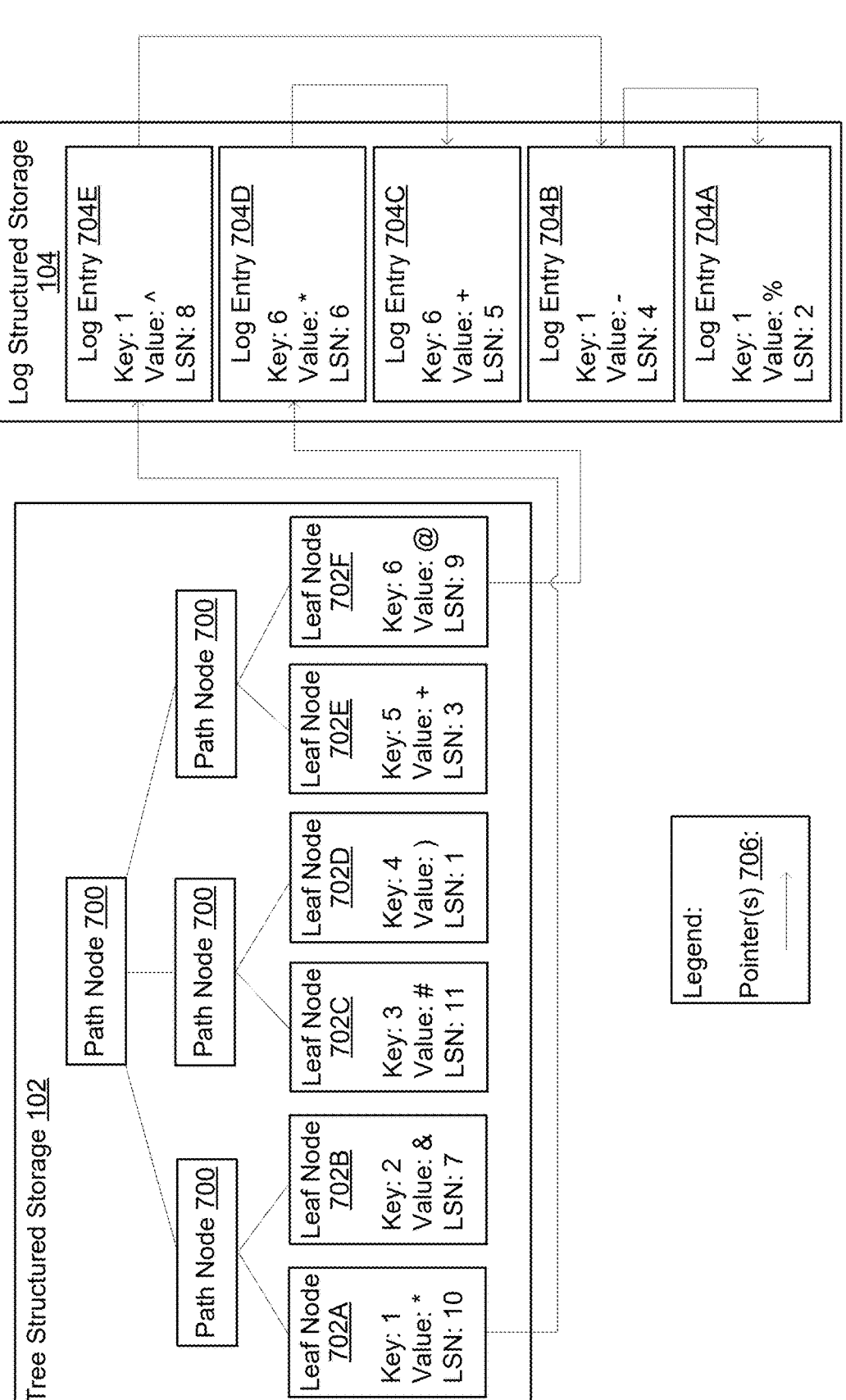
FIG. 7A illustrates a tree structured storage and a log structured storage of a multi-version database, according to some embodiments.

FIG. 7A illustrates a tree structured storage and a log structured storage of a multi-version database, according to some embodiments.

As illustrated in the example FIG. 7A, tree structured storage 102 includes current versions of data associated with respective key stored in leaf nodes 702 that are also associated with the respective keys. The leaf nodes may also include pointers 706 to the immediate prior versions of the data associated with the respective keys, which is stored in the log structured storage 104. The tree structured storage 102 may also include path nodes 700, which may be parent nodes of the leaf nodes 702 and may enable the data storage system to locate a particular leaf node associated with a particular key. For example, the root node, the path node 700 at the top of the tree structured storage 102, may indicate that keys 1 and 2 correspond to leaf nodes 702 to the left, that keys 3 and 4 correspond to leaf nodes 702 in the center, and keys 5 and 6 correspond to leaf nodes 702 to the right.

The tree structured storage 102 illustrated in FIG. 7A uses a balanced non-binary tree structure. In some embodiments, the tree structured storage 102 may use other types of tree structures, such as a non-balanced tree structure or a binary tree structure.

The pointers 706 lead from a particular version of data associated with a given key to the immediately previous version of data associated with the same given key. Current versions of data are located in the tree structured storage 102, and pointers 706 to the previous versions point to portions of data that are located in the log structured storage 104. Prior versions of data are located in the log structured storage 104.

The LSNs of current versions of data associated with respective keys in the tree structured storage 102 may indicate information about the data. For example, the data in leaf node 702D is associated with LSN 1. The data in leaf node 702D being associated with LSN 1 may indicate that the data in leaf node 702D was added to the tree structured storage 102 at LSN 1, which may correspond to a particular time in a timing system of the data storage system. At LSN 1, when the data in leaf node 702D was added to the tree structured storage 102, data corresponding to the same key, 4, may have been added to the log structured storage 104. There is no pointer 706 from leaf node 702D, so the previous data of key 4 may have been subsequently trimmed from the log structured storage 104. The data of leaf node 702D may have been data from an insert write, or data restored from a snapshot.

The LSNs of current versions of data associated with different respective keys may not indicate relationships between the current versions of data associated with different respective keys. For example, the data stored at leaf node 702C is associated with LSN 11. Compared to LSN 1, which is associated with the data stored at leaf node 702D, LSN 11 is higher and therefore later. The data of leaf node 702D is a current version of data even though another leaf node (702C) is associated with a higher LSN. The data of leaf node 702D remains a current version of data until a write transaction is executed in association with the key corresponding to the data stored in leaf node 702D, key 4.

Once the database storage system has identified the current version of data corresponding to a key, the database storage system may follow pointers 706 to previous versions of the data corresponding to the key. For example, key 1 is associated with the data stored in leaf node 702A. The data stored in leaf node 702A is associated with LSN 10. Leaf node 702A includes a pointer 706 to log entry 704E. Log entry 704E is also associated with key 1, and is associated with LSN 8. Log entry 704E includes a pointer 706 to log entry 704B. Log entry 704B is also associated with key 1, and is associated with LSN 4. Log entry 704B includes a pointer 706 to log entry 704A. Log entry 704A is also associated with key 1, is associated with LSN 2, and does not include a pointer 706. The data located at log entry 704B and log entry 704A may be called ancestor versions of the data located at leaf node 702A because the data located at log entry 704B and log entry 704A are prior versions of data associated with the key corresponding to the current version of the data located at leaf node 702A that are not the immediately prior version of the current version of the data associated with the key, which is the data located at log entry 704E. Similarly, the data located at log entry 704C is the ancestor version of the data located at leaf node 702F and the data located at log entry 704D is the immediately prior version of the data at leaf node 702F.

By following pointers 706 from leaf node 702A, the database storage system may obtain information that creates a timeline, based on the logical sequence numbers, of changes to data associated with key 1. At LSN 1, key 1 did not exist, or the data associated with key 1 is unknown. From LSN 2 to LSN 3, the data associated with key 1 was "%". From LSN 4 to LSN 7, the data associated with key 1 was "-". From LSN 8 to LSN 9, the data associated with key 1 was "". At LSN 10, the data associated with key 1 became "*", which is the current version of data associated with key 1.

LSNs are illustrated in FIG. 7A as unique and sequential. In some embodiments, the same LSN may be associated with data at multiple leaf nodes or log entries. Additionally, in some embodiments, writes may be processed out of order.

Figure 7B:
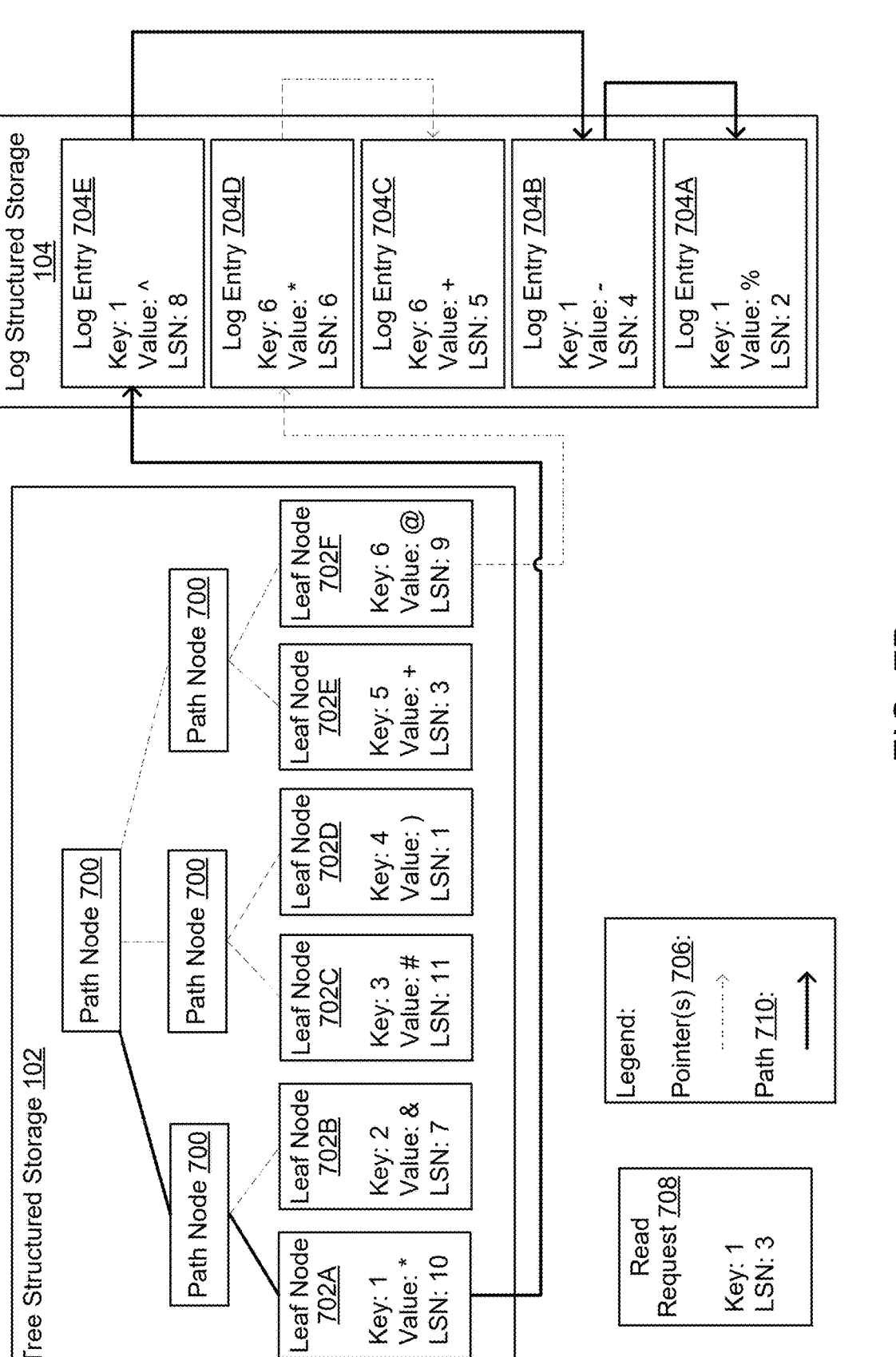
FIG. 7B illustrates a tree structured storage and a log structured storage of a multi-version database, for example while a read for an ancestor version of prior data is being performed, according to some embodiments.

FIG. 7B illustrates a tree structured storage and a log structured storage of a multi-version database, for example while a read for an ancestor version of prior data is being performed, according to some embodiments.

The database storage system, or more particularly a component of storage node 100 such as query processor 106, may receive read requests such as read request 708. Read request 708 specifies key 1 and LSN 3, so the database storage system, or more particularly query processor 106, may search the tree structured storage 102 and log structured storage 104 for the data that was associated with key 1 at LSN 3. The read request LSN may be based on the time the read request 708 was generated or received, or the read request LSN may be based on a specific prior time that the client which sent the read request 708 specified. The database storage system may follow path 710, which may be based on the specified key 1. The path nodes 700 of the tree structured storage 102 may indicate leaf node 702A is the particular one of the leaf nodes 702 that is associated with key 1. The database storage system may check the LSN associated with the data located at leaf node 702A. LSN 10 is higher than LSN 3, so leaf node 702A is later than the read request 708. The database storage system may follow the path 710, using the pointer 706 from leaf node 702A to log entry 704E (not illustrated in FIG. 7B) which indicates the location of a prior version of data associated with the key.

The database storage system may determine that the data located at log entry 704E is associated with LSN 8. LSN 8 is higher than LSN 3, so log entry 704E is later than the read request 708. The database storage system may follow the path 710 using the pointer 706 from log entry 704E to log entry 704B (not illustrated in FIG. 7B). The database storage system may determine that the data located at log entry 704B is associated with LSN 4. LSN is higher than LSN 3, so log entry 704B is later than the read request 708. The database storage system may follow the path 710 using the pointer 706 from log entry 704B to log entry 704A (not illustrated in FIG. 7B). The database storage system may determine that the data located at log entry 704A is associated with LSN 2. LSN 2 is lower than LSN 3, so log entry 704A is earlier than read request 708. The database storage system may determine the data located in log entry 704A is the data that was the current version of the data associated with key 1 at LSN 3. The database storage system may return the data located at log entry 704A, "%", in response to read request 708.

Figure 7C:
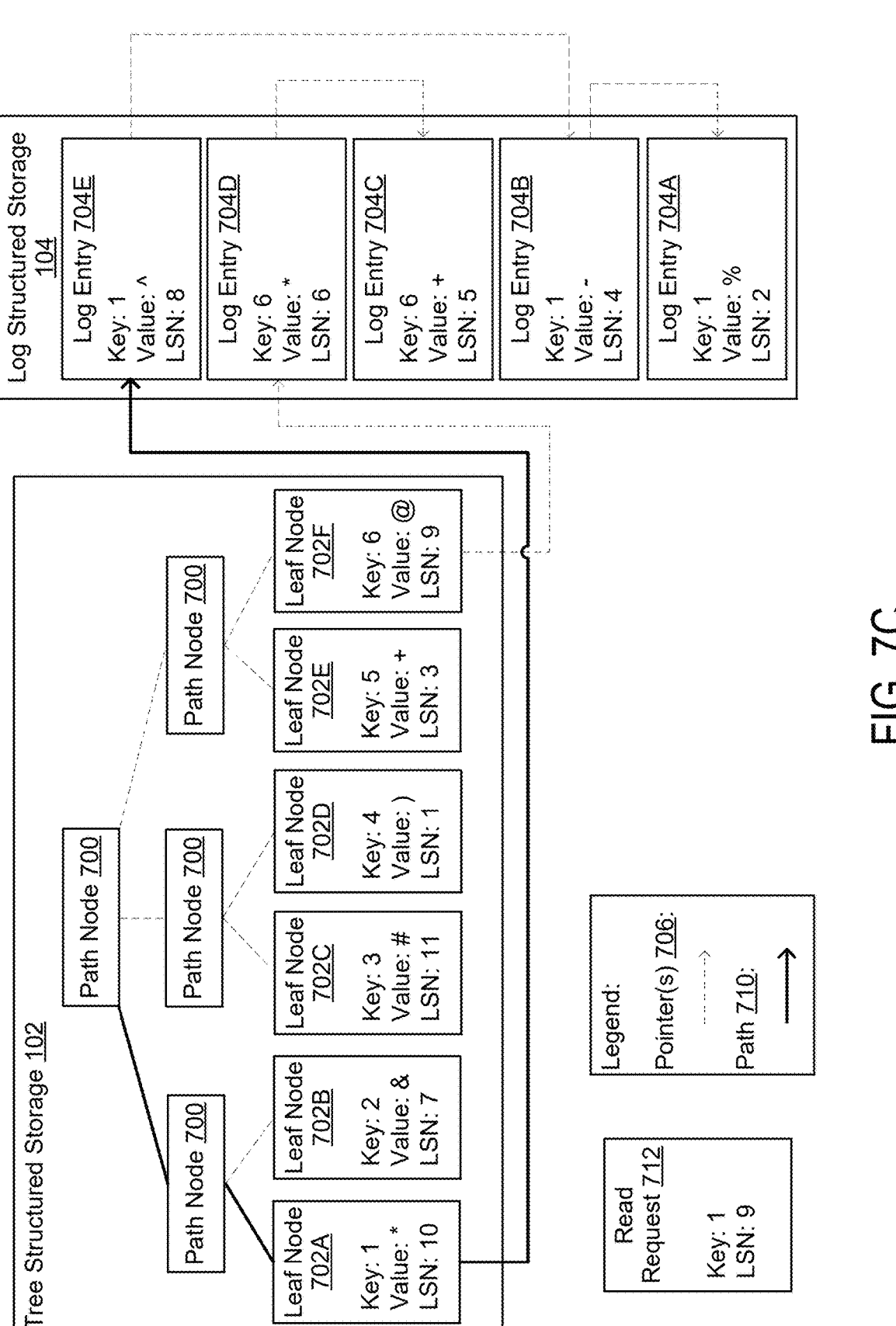
FIG. 7C illustrates a tree structured storage and a log structured storage of a multi-version database, for example while a read for a recent prior version of data is being performed, according to some embodiments.

FIG. 7C illustrates a tree structured storage and a log structured storage of a multi-version database, for example while a read for a recent prior version of data is being performed, according to some embodiments.

The database storage system may receive a read request such as read request 712, which specifies key 1 and LSN 9. The read request LSN may be based on the time the read request 712 was generated or received, or the read request LSN may be based on a specific prior time that the client which sent the read request 712 specified. The database storage system may locate the requested data by following the path 710, which may be based on the key specified in the request. The database storage system may follow indications of the path nodes 700 to the particular leaf node 702A which is associated with key 1. The database storage system may determine the data located at leaf node 702A is associated with LSN 10. LSN is higher than LSN 9, so leaf node 702A is later than read request 712.

The database storage system may follow the path 710, using the pointer 706 from leaf node 702A to log entry 704E (not illustrated in FIG. 7C). The database storage system may determine log entry 704E is associated with LSN 8. LSN 8 is lower than LSN 9, so log entry 704E is earlier than the read request 712. The database storage system may determine the data located at log entry 704E was the current version of the data associated with key 1 at LSN 9. The database storage system may return "" in response to read request 712.

Figure 7D:
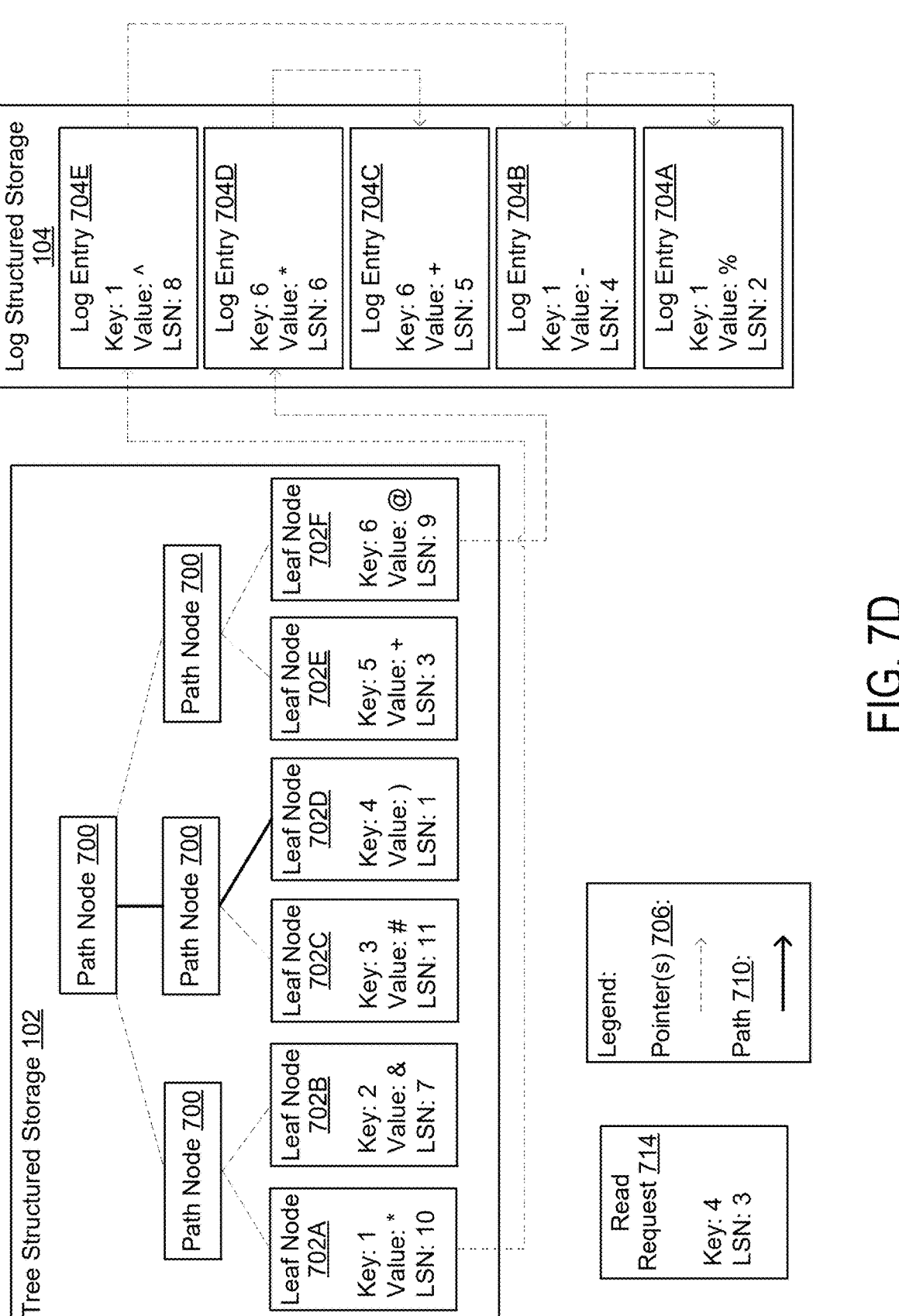
FIG. 7D illustrates a tree structured storage and a log structured storage of a multi-version database, for example while a read for a current version of data is being performed, according to some embodiments.

FIG. 7D illustrates a tree structured storage and a log structured storage of a multi-version database, for example while a read for a current version of data is being performed, according to some embodiments.

The database storage system may receive a read request such as read request 714, which specifies key 4 and LSN 3. The read request LSN may be based on the time the read request 714 was generated or received, or the read request LSN may be based on a specific prior time that the client which sent the read request 714 specified. The database storage system may follow the path 710 to locate data responsive to the read request 714. The path 710 may be based on the key specified in the request, which is key 4 for read request 714. The path nodes 700 may include indications that leaf node 702D is the particular one of the leaf nodes 702 associated with key 4. The database system may determine leaf node 702D is associated with LSN 1. LSN 1 is lower than LSN 3, so leaf node 702D is earlier than read request 714. The database storage system may determine the data located at leaf node 702D was the current version of data for the key at the time of the read request 714. The database storage system may return the data located at leaf node 702D, ")", in response to read request 714.

Figure 7E:
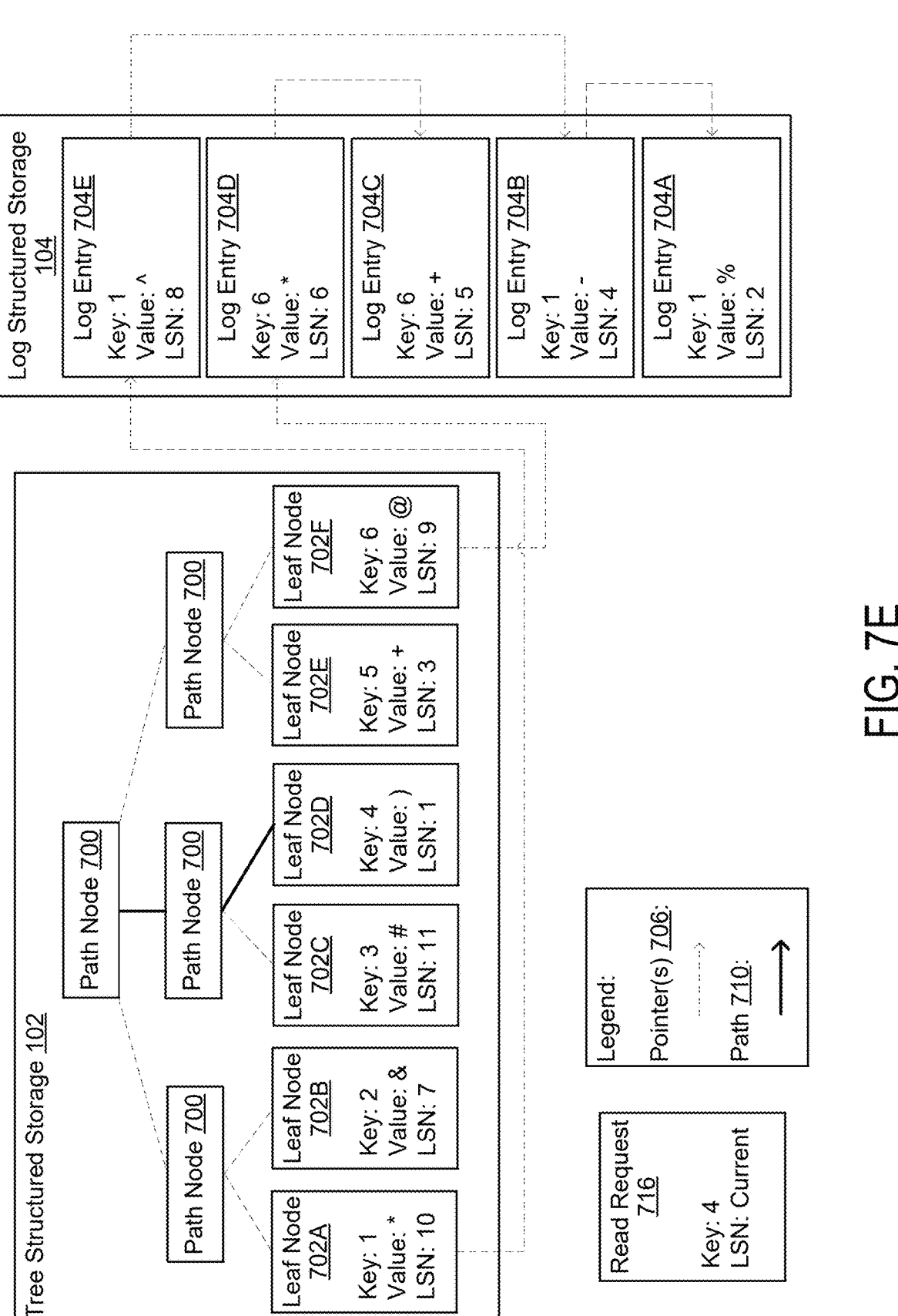
FIG. 7E illustrates a tree structured storage and a log structured storage of a multi-version database, for example while a read for current data is being performed, according to some embodiments.

FIG. 7E illustrates a tree structured storage and a log structured storage of a multi-version database, for example while a read for current data is being performed, according to some embodiments.

A database storage system may receive a read request such as read request 716, as an example. Read request 716 specifies key 4 and the current version. Read requests may specify versions of data because the database storage system may count versions based on the number of pointers from the current version of the data. Read request 716 specifies the current version of the data associated with key 4, which is the same as the version which is zero pointers away from the current version of the data associated with key 4. Other read requests may specify a version of the data that is a particular number of pointers away from the current version of the data. Version-based requests may be independent of LSNs or other information related to a timing system.

The database storage system may locate the data for the read request 716 by following the path 710. The path nodes 700 may include indications that leaf node 702D is the particular one of the leaf nodes 702 associated with key 4. The database storage system may determine that leaf node 702D is zero pointers away from the current version of data associated with the key, and thus that the data located at leaf node 702D is the current version of the data. The database storage system may return the data at leaf node 702D, "()", in response to read request 716.

Figure 8A:
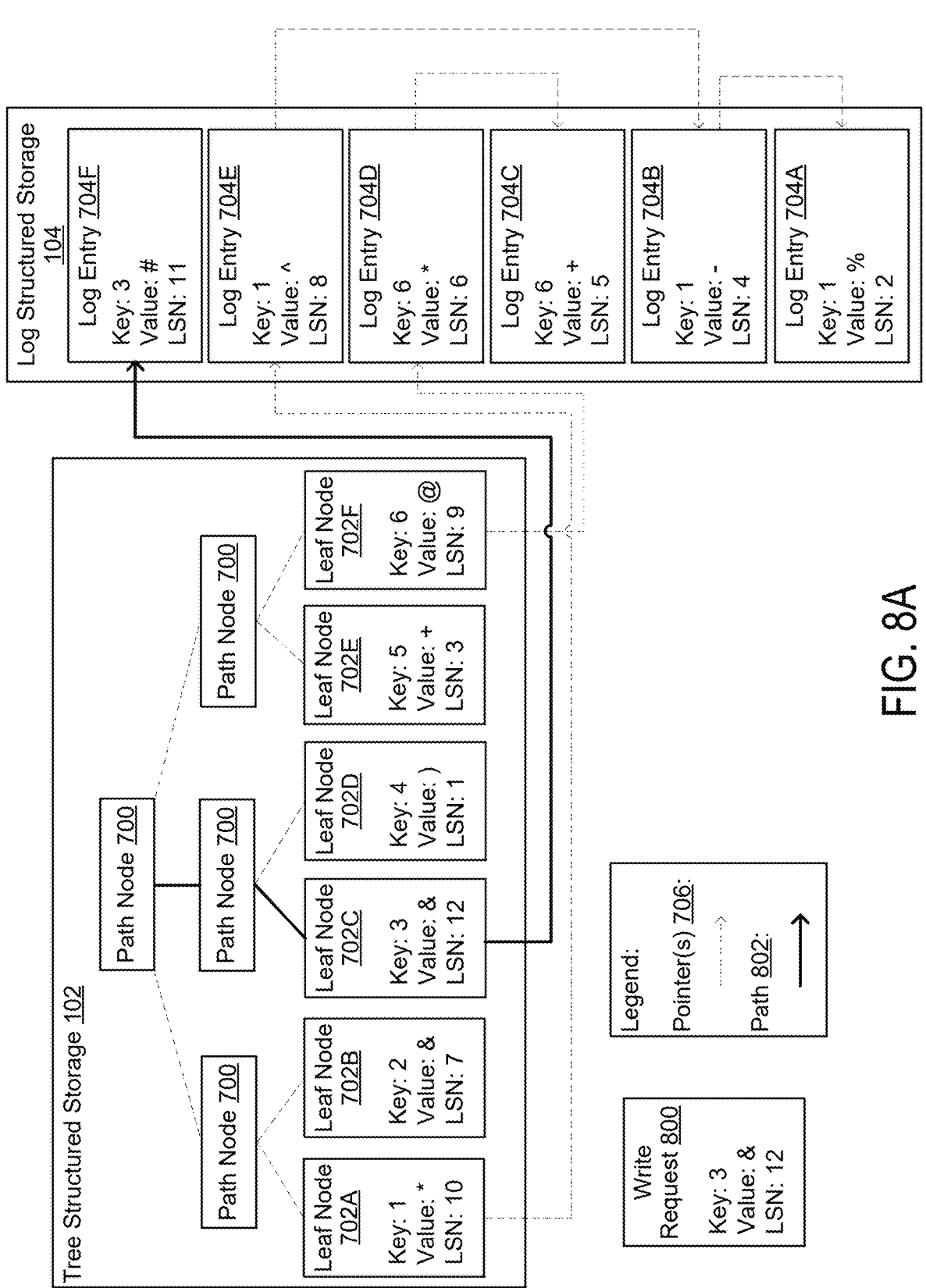
FIG. 8A illustrates a tree structured storage and a log structured storage of a multi-version database, for example while a write that updates data is being performed, according to some embodiments.

FIG. 8A illustrates a tree structured storage and a log structured storage of a multi-version database, for example while a write that updates data is being performed, according to some embodiments.

The database storage system, or more particularly a transaction processor 108 component of the storage node 100, may receive write requests, such as write request 800. The write request 800 may include an indication of when the write request was generated or received, which is LSN 12 for write request 800. The database storage system, or more particularly transaction processor 108, may follow the path 802 to execute the transaction for write request 800. The database storage system may follow indications in path nodes 700 to leaf node 702C, which is associated with key 3.

The database storage system may write the updated data from the write request, "&", as well as the LSN of the write request 800 to leaf node 702C. The LSN of the write request may indicate when the current version of the data associated with a given key was written to the tree structured storage 102 and when the prior version of the data associated with the given key was removed from the tree structured storage 102. The database storage system may also write a pointer from leaf node 702C to a new log entry 704F, which the database storage system may write to the log structured storage 104. New log entry 704F may include the data that was previously stored at leaf node 702C and the LSN associated with that data.

Figure 8B:
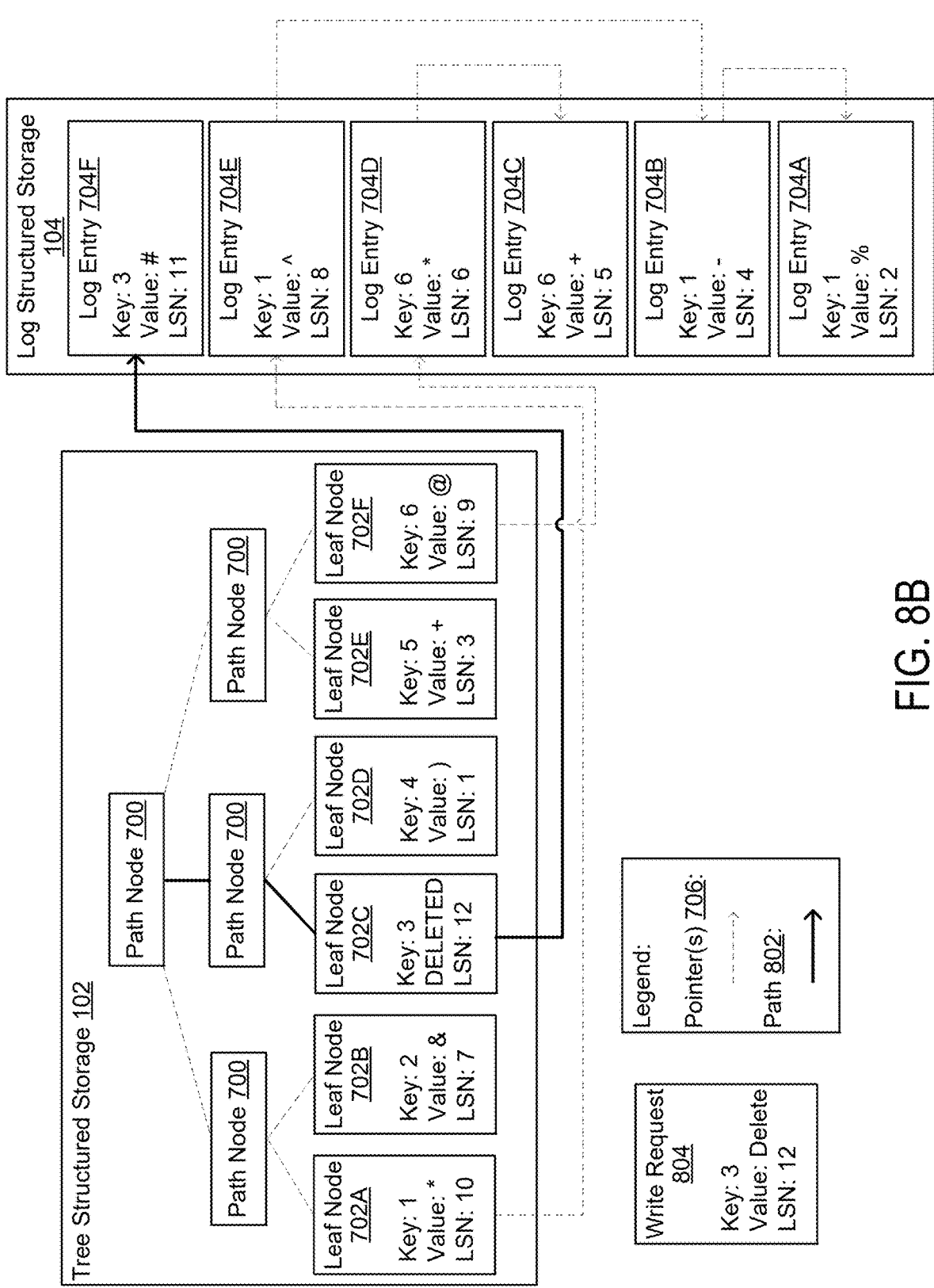
FIG. 8B illustrates a tree structured storage and a log structured storage of a multi-version database, for example while a write that deletes data is being performed, according to some embodiments.

FIG. 8B illustrates a tree structured storage and a log structured storage of a multi-version database, for example while a write that deletes data is being performed, according to some embodiments.

The database storage system may receive delete writes, such as write request 804. Write request 804 may include the key associated with data to be deleted, and indication that data is to be deleted, and the time, or LSN, at which the data is to be deleted. The database storage system may execute write request 804 by following path 802. The database storage system may follow indications in the path nodes 700 to locate the leaf node 702C associated with key 3. The database storage system may write to leaf node 702C a marker that the data associated with key 3 is deleted, and the LSN indicating when the data associated with key 3 was deleted. The database storage system may also write a pointer from leaf node 702C to a new log entry 704F, which the database storage system may write to the log structured storage 104. New log entry 704F may include the data that was previously stored at leaf node 702C and the LSN associated with that data.

The data located at log entry 704F may be accessible until log entry 704F is removed from the log via a garbage collection process of the database storage system. Leaf node 702C may be added to a list indicating available leaf nodes 702 for new keys. An insert write which causes the database storage system to add a new key to the database may cause the database storage system to replace the key associated with leaf node 702C with a new key. The insert write may remove the pointer from leaf node 702C to log entry 704F. Leaf node 702C, with a marker indicating the data associated with the key is deleted, may not be included in a snapshot and thus may not be included in data reconstructed based on the snapshot.

Figures 9A, 9B:
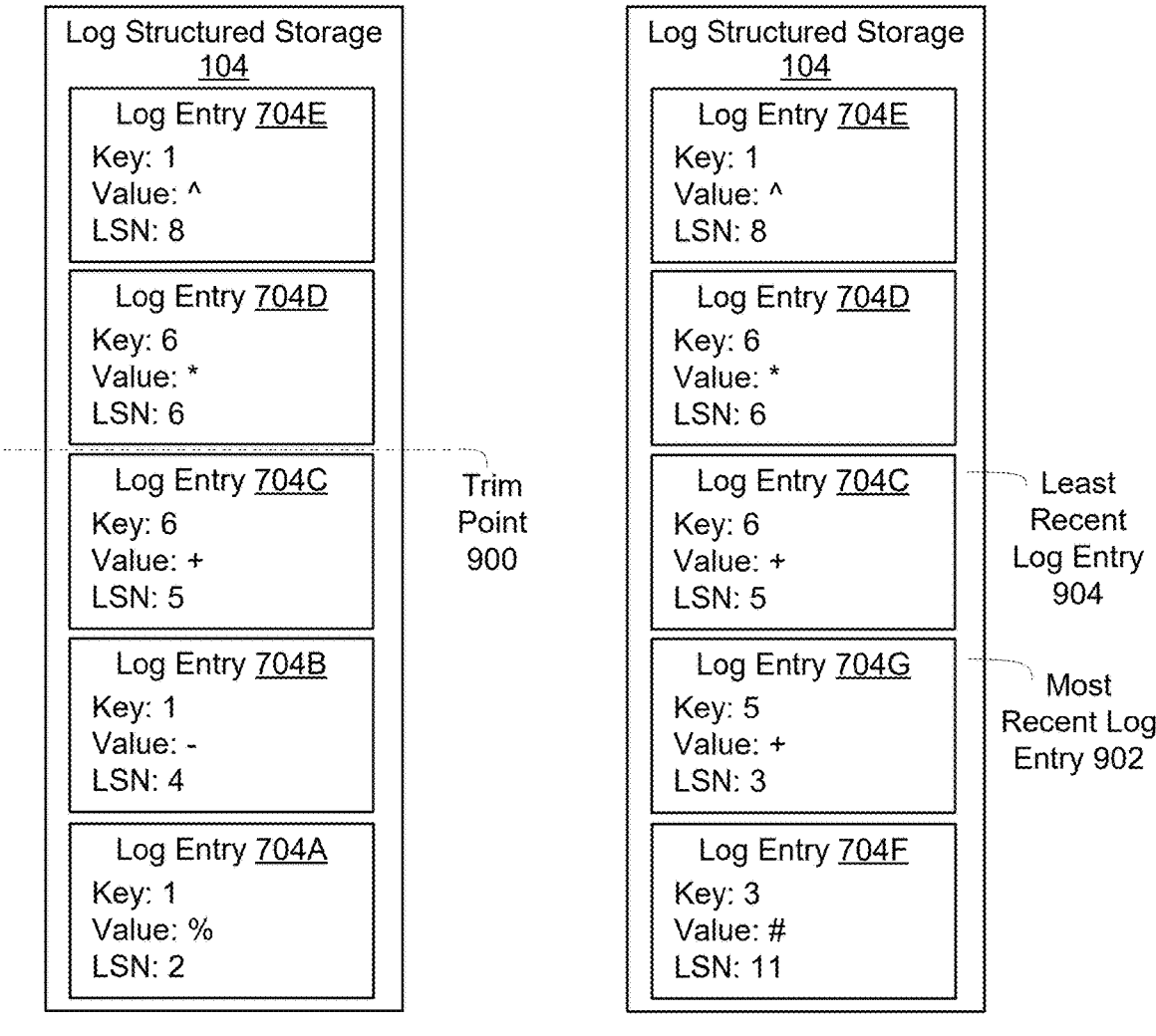
FIG. 9A illustrates a log structured storage during a garbage collection process, for example while the log structure is being trimmed, according to some embodiments.
FIG. 9B illustrates a log structured storage during a garbage collection process, for example during a wrap-around overwriting process, according to some embodiments.

FIG. 9A illustrates a log structured storage during a garbage collection process, for example while the log structured storage is being trimmed, according to some embodiments.

The database storage system may perform garbage collection of old data by trimming the log. In FIG. 9A, the database storage system has selected a trim point 900 between log entries 704D and 704C. Log entry 704D is the least recent log entry that is not below the trim point. Log entry 704C, log entry 704B, and log entry 704A are less recent log entries than log entry 704D. The database storage system may delete log entry 704C, log entry 704B, and log entry 704A.

Although the LSNs indicate log entry 704D is later than log entry 704C, log entry 704B, and log entry 704A, the arrival time of the log entries 704 at the log structured storage 104 is the operative information relevant to trimming the log structured storage 104, and the sequence of the log entries 704 is indicated by the order of the log entries 704. In the example illustrated in FIG. 9A, the log entries 704 were added to the log structured storage 104 in order from the lowest log entry to the highest, so the lowest log entry 704A is the oldest log entry 704.

FIG. 9B illustrates a log structured storage during a garbage collection process, for example during a wraparound overwriting process, according to some embodiments.

In some embodiments, the database storage system may trim the log structured storage 104 by allowing the oldest log entries to be overwritten. The log structured storage 104 may be stored in a wraparound organization, such that the least recent log entry 904, which is the oldest log entry, is stored beside the most recent log entry 902, which is the newest log entry. In the example illustrated in FIG. 9B, the database storage system wrote log entry 704F to the storage location log entry 704A previously occupied, and wrote log entry 704G to the storage location log entry 704B previously occupied.

Log entry 704G is the most recent log entry 902 despite being associated with the lowest LSN because, in the example illustrated in FIG. 9B, the associated LSN indicates when the data became the current version of the data associated with a given key, not when the data stopped being the current version of the data associated with the given key. Log entry 704C is the least recent log entry 904, and the database storage system may overwrite log entry 704C when the database storage system writes the next log entry 704 to the log.

Figure 10:
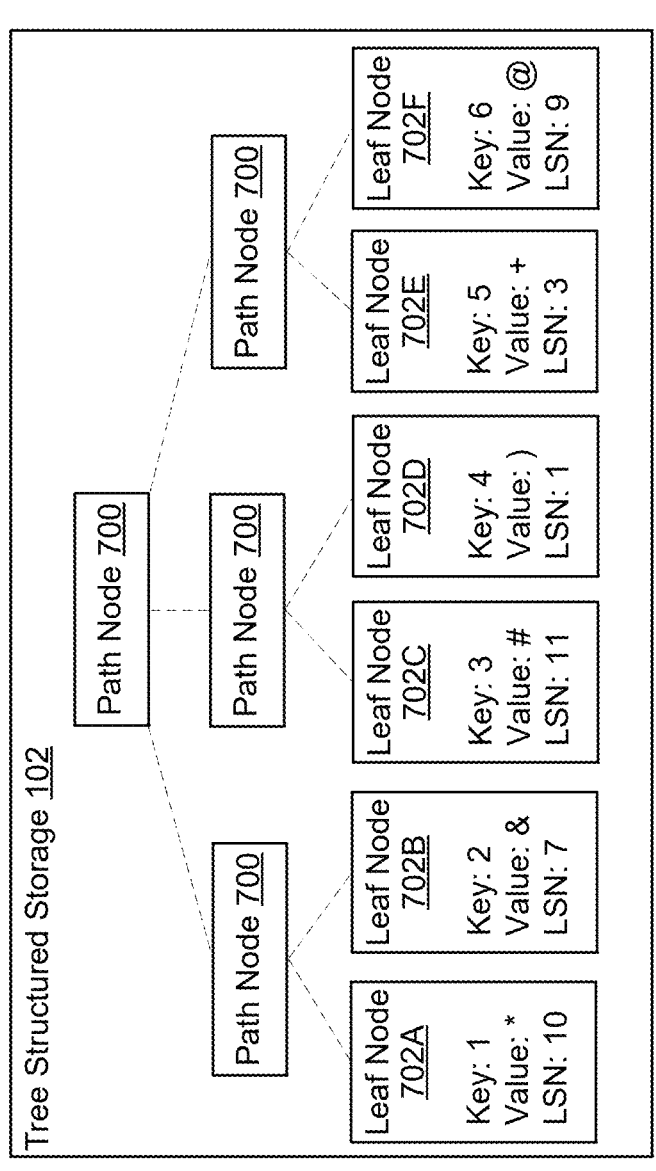
FIG. 10 illustrates a snapshot of a multi-version database, according to some embodiments.

FIG. 10 illustrates a snapshot of a multi-version database, according to some embodiments.

The database storage system may generate a snapshot of the database to recover the database in the event there is a crash at the computing devices hosting the database. A snapshot may include the information that is located in the tree structured storage 102 and log structured storage 104, including LSNs and pointers to prior versions of data associated with respective keys.

In some embodiments, the database storage system may create a snapshot similar to snapshot 1000, which includes the keys, associated data, and LSNs from the tree structured storage 102. The data that is included in snapshot 1000 is current data, because data located in the tree structured storage 102 is current data. In the event of a crash, the database storage system may reconstruct the database using snapshot 1000. The database storage system may use the LSNs included in snapshot 1000 to correctly read a reconstructed database. Snapshot 1000, which may be called a tree snapshot, may require fewer computational resources to store than a snapshot which includes information from the log structured storage 104. In some embodiments, snapshots may not include LSNs associated with the current versions of the data.

FIG. 11 is a flowchart illustrating a method of executing a read request for a multi-version database, according to some embodiments.

At 1100, the database storage system receives a read request directed to data stored in a tree-log structured database. A tree-log database may be a multi-version database which stores current data in a tree structured storage and prior data in a log structured storage.

At 1102, the database storage system finds the current data for the read request in the tree structured storage of the tree-log database. The current data for the request may be the current version of the data which corresponds to a key specified in the request.

At 1104, the database storage system checks the sequence indicator, such as an LSN, of the current version of the data against the sequence indicator of the request.

At 1106, the database storage system determines if the current data sequence indicator is correct for the request. The current data sequence indicator may be correct if the current data sequence indicator is equal to or below the sequence indicator of the request.

If the database storage system determines the current data sequence indicator is correct for the request, at 1108 the database storage system returns the current version of the data, which is stored in the tree, in response to the read request.

If the database storage system determines the current data sequence indicator is not correct for the request, at 1110 the database storage system follows the pointer to the previous version of the current version of the data corresponding to the key of the request. If there is not a pointer to a previous version of the data, the database storage system may return an error message in response to the request.

At 1112, the database storage system checks the sequence indicator of the previous version of the data against the sequence indicator of the request.

At 1114, the database storage system determines whether the previous data sequence indicator is correct for the request. The previous data sequence indicator may be correct if the previous data sequence indicator is equal to or below the sequence indicator of the request.

If the database storage system determines the previous data sequence indicator is not correct for the request, at 1110 the database storage system may follow a pointer from the previous version of the data to an earlier version of previous data. If there is no pointer to an earlier version of previous data, the database storage system may return an error message in response to the request.

If the database storage system determines the previous data sequence indicator is correct for the request, at 1116 the database storage system may return the previous version of the data, which is stored in the log, in response to the read request.

Figure 12:
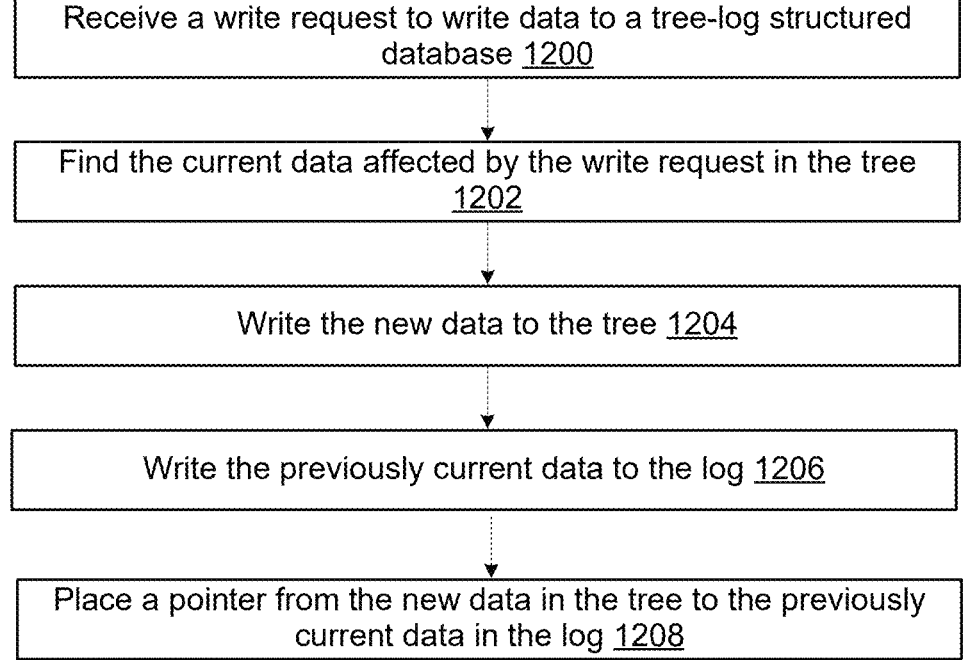
FIG. 12 is a flowchart illustrating a method of executing a write request for a multi-version database, according to some embodiments.

FIG. 12 is a flowchart illustrating a method of executing a write request for a multi-version database, according to some embodiments.

At 1200, the database storage system receives a write request to write data to a tree-log structured database.

At 1202, the database storage system finds the current data for the write, which is the data affected by the write, in the database. The current data for the write may be the version of the data associated with the key specified in the write request which was current before the write request was received.

At 1204, the database storage system writes the new data to the tree. The new data may be the data that was specified in the write request, and is the current version of the data associated with the key as of the write request.

At 1206, the database storage system writes the previously current data to the log. The previously current data may be the version of the data that the database storage system located at 1202, which was the current version of the data associated with the key before the write request was received.

At 1208, the database storage system places a pointer from the new data in the tree to the previously current data in the log. The new data in the tree is the current version of the data associated with the key as of the write request. The previously current data in the log is the prior version of the data associated with the key as of the write request.

Example Computer System

Figure 13:
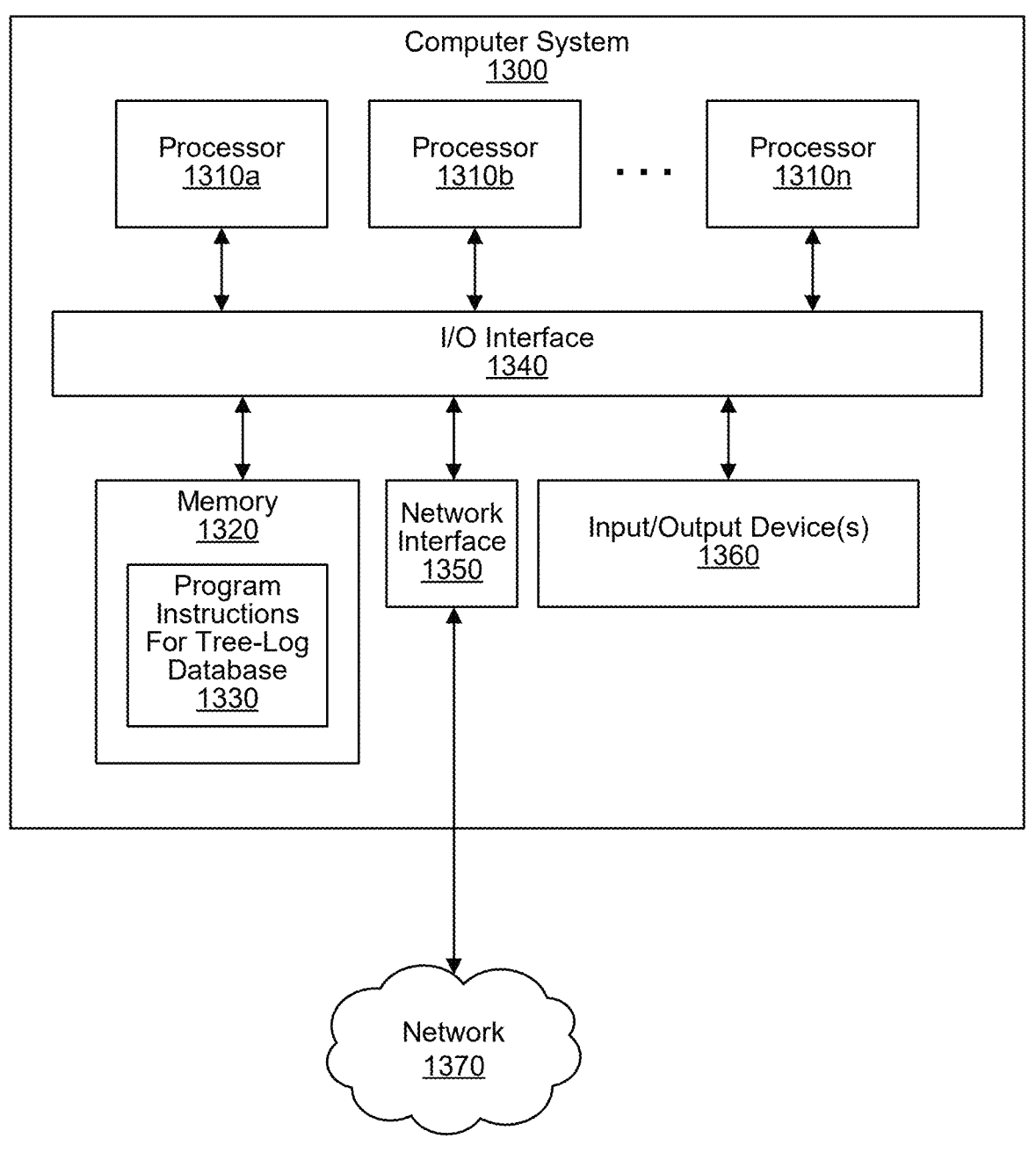
FIG. 13 is a block diagram illustrating an example computer system that implements some or all of the techniques described herein, according to some embodiments.

FIG. 13 is a block diagram illustrating an example computer system that implements some or all of the techniques described herein, according to some embodiments.

FIG. 13 illustrates exemplary computer system 1300 usable to implement the database storage system as described above with reference to FIGS. 1-12. In different embodiments, computer system 1300 may be any of various types of devices, including, but not limited to, a network computer, a mobile device, a consumer device, application server, storage device, a peripheral device such as a switch, modem, router, or in general any type of computing or electronic device.

Various embodiments of program instructions for a database storage system, as described herein, may be executed in one or more computer systems 1300, which may interact with various other devices. Note that any component, action, or functionality described above with respect to FIGS. 1-12 may be implemented on one or more computers configured as computer system 1300 of FIG. 1300, according to various embodiments. In the illustrated embodiment, computer system 1300 includes one or more processors 1310 coupled to a system memory 1320 via an input/output (I/O) interface 1340. Computer system 1300 further includes a network interface 1350 coupled to I/O interface 1340, and one or more input/output devices 1360. In some cases, it is contemplated that embodiments may be implemented using a single instance of computer system 1300, while in other embodiments multiple such computer systems, or multiple nodes making up computer system 1300, may be configured to host different portions or instances program instructions as described above for various embodiments. For example, in one embodiment some elements of the program instructions may be implemented via one or more nodes of computer system 1300 that are distinct from those nodes implementing other elements.

In some embodiments, computer system 1300 may be implemented as a system on a chip (SoC). For example, in some embodiments, processors 1310, memory 1320, I/O interface 1340 (e.g., a fabric), etc. may be implemented in a single SoC comprising multiple components integrated into a single chip. For example, a SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1320 may be configured to store compression or decompression program instructions for a database storage system 1330 accessible by one or more of the processors 1310. In various embodiments, system memory 1320 may be implemented using any suitable memory technology, such as static random-access memory (SRAM), synchronous dynamic RAM (SDRAM), nonvolatile/Flash-type memory, or any other type of memory. In the illustrated embodiment, program instructions for a database storage system 1330 may be configured to implement any of the functionality described above. In some embodiments, program instructions and/or data may be received, sent, or stored upon different types of computer-accessible media or on similar media separate from system memory 1320 or computer system 1300.

In one embodiment, I/O interface 1340 may be configured to coordinate I/O traffic between processor 1310, system memory 1320, and any peripheral devices in the device, including network interface 1350 or other peripheral interfaces, such as input/output devices 1360. In some embodiments, I/O interface 1340 may perform any necessary protocol, timing, or other data transformations to convert data signals from one component (e.g., system memory 1320) into a format suitable for use by another component (e.g., processor 1310). In some embodiments, I/O interface 1340 may include support for devices attached through various types of peripheral buses, such as a variant of the Peripheral Component Interconnect (PCI) bus standard or the Universal Serial Bus (USB) standard, for example. In some embodiments, the function of I/O interface 1340 may be split into two or more separate components, such as a north bridge and a south bridge, for example. Also, in some embodiments, some or all of the functionality of I/O interface 1340, such as an interface to system memory 1320, may be incorporated directly into processor 1310.

Network interface 1350 may be configured to allow data to be exchanged between computer system 1300 and other devices attached to a network 1370 (e.g., carrier or agent devices) or between nodes of computer system 1300. Network 1370 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1350 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1360 may, in some embodiments, include one or more display terminals, keyboards, keypads, touchpads, scanning devices, voice or optical recognition devices, or any other devices suitable for entering or accessing data by one or more computer systems 1300. Multiple input/output devices 1360 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1350.

As shown in FIG. 13, memory 1320 may include program instructions for a database storage system 1330, which may be processor-executable to implement any element or action described above. In one embodiment, the program instructions may implement the methods described above. In other embodiments, different elements and data may be included.

Computer system 1300 may also be connected to other devices that are not illustrated, or instead may operate as a stand-alone system. In addition, the functionality provided by the illustrated components may in some embodiments, be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
one or more computing devices implementing a database, wherein current data of the database is stored in a balanced tree structure and prior data of the database is stored in a log, wherein:
respective nodes of the balanced tree structure storing respective portions of the current data also store metadata indicating a time at which respective portions of the prior data were removed from the balanced tree structure, and respective pointers to respective locations in the log where the respective portions of the prior data are stored;
the database is configured to return a given portion of the current data or a given portion of the prior data, according to a request time of a read request; and
the database is configured to move a replaced portion of the current data from the balanced tree structure to the log in response to executing a write request comprising a new portion of the current data corresponding to the replaced portion of the current data.

2. The system of claim 1, wherein:
to return the given portion of the prior data, the database:
determines that the time at which the given portion of the prior data was removed from the balanced tree structure is later than the request time of the read request; and
uses a pointer to locate the given portion of the prior data.

3. The system of claim 1, wherein:
to return the given portion of the current data, the database:
determines that the time at which the given portion of the prior data was removed from the balanced tree structure is earlier than the request time of the read request; or
determines that the request time of the read request is independent of the time at which the given portion of the prior data was removed from the balanced tree structure.

4. The system of claim 1, wherein:
the replaced portion of the current data and the new portion of the current data each correspond to a same key.

5. The system of claim 4, wherein:
a particular node of the balanced tree structure storing the new portion of the current data also stores a time at which the replaced portion of the current data was removed from the balanced tree structure and a pointer to the replaced portion of the current data stored in the log.

6. The system of claim 4, wherein:
a particular node of the balanced tree stores a particular portion of the current data corresponding to another key and a particular pointer to a particular portion of the prior data; and
the particular portion of the prior data corresponds to the same other key.

7. A method, comprising:
receiving, at a storage node, a read request comprising a sequence indicator and a key for data stored in a database, wherein:
more than one version of the data associated with the key is stored by the storage node;
the storage node stores current data using a tree structure; and
the storage node stores prior versions of data using a log structure;
locating a current version of the data associated with the key in the tree structure;
determining, in response to said locating the current version of the data, a sequence indicator of the current version of the data associated with the key is after the sequence indicator of the read request;
locating, in response to said determining, a prior version of the data associated with the key in the log structure; and
returning the prior version of the data associated with the key in response to the read request.

8. The method of claim 7, wherein:
the current version of the data associated with the key corresponds to a pointer to the prior version of the data associated with the key; and
said locating the prior version of the data associated with the key in the log structure comprises following the pointer.

9. The method of claim 7, wherein the log structure stores the prior version of the data with a pointer to an additional prior version of the data associated with the key, wherein the additional prior version of the data corresponds associated with the key is older than the prior version of the data associated with the key.

10. The method of claim 9, further comprising:
receiving another read request comprising another sequence indicator and the key;
determining a sequence indicator of the prior version of the data associated with the key is later than the sequence indicator of the another read request;
locating the additional prior version of the data associated with the key in the log structure; and
returning the additional prior version of the data associated with the key in response to the another read request.

11. The method of claim 7, further comprising:
receiving another read request comprising another sequence indicator and the key;
determining a sequence indicator of the current version of the data associate with the key is earlier than the sequence indicator of the another read request; and
returning the current version of the data associated with the key in response to the another read request.

12. The method of claim 7, further comprising:
receiving another read request comprising the key, wherein the another read request is independent of the sequence indicator of the current version of the data associated with the key;
locating the current version of the data associated with the key in the tree structure; and returning the current version of the data associated with the key in response to the another read request.

13. The method of claim 7, further comprising:

generating snapshot data of the database, wherein the snapshot data comprises the current version of the data associated with the key.

14. A method, comprising:

receiving a write request comprising a key and a current version of data associated with the key, wherein:

the key corresponds to a prior version of the data that is stored in a database;

storage nodes of the database store current versions of data using a tree structure; and the storage nodes of the database store prior versions of data using a log structure;

writing, in response to said receiving the write request, a prior version of the data associated with the key to the log structure;

removing the prior version of the data associated with the key from the tree structure; and writing the current version of the data associated with the key to the tree structure.

15. The method of claim 14, wherein said writing the current version of the data associated with the key to the tree structure comprises writing a pointer from the current version of the data associated with the key in the tree structure to the prior data in the log structure.

16. The method of claim 15, wherein the storage nodes of the database storing the current versions of data in the tree structure also store indications of times at which the prior data was removed from the tree structure.

17. The method of claim 14, further comprising:

receiving a read request comprising a sequence indicator and the key;

locating the current version of the data associated with the key in the tree structure;

determining a sequence indicator of the current version of the data associated with the key is after the time of the read request;

locating the prior version of the data associated with the key in the log structure; and returning the prior version of the data associated with the key in response to the read request.

18. The method of claim 14, wherein:

the write request comprises an indication the prior version of the data associated with the key is to be deleted; and said writing the current version of the data associated with the key to the tree structure comprises writing, to the tree structure, an indication that the prior version of the data associated with the key has been deleted.

19. The method of claim 14, further comprising:

removing old data from the database, wherein said removing the old data from the database is performed by trimming the log.

20. The method of claim 19, wherein said trimming of the log is performed by overwriting the old data with the prior version of the data associated with the key.

* * * * *